(12) United States Patent
Zhou et al.

(10) Patent No.: US 8,673,057 B2
(45) Date of Patent: Mar. 18, 2014

(54) ZEOLITE DDR MEMBRANES

(75) Inventors: Zhengzhi Zhou, Atlanta, GA (US);
Sankar Nair, Atlanta, GA (US)

(73) Assignee: Georgia Tech Research Corporation,
Atlanta, GA (US)

( * ) Notice: Subject to any disclaimer, the term of this patent is extended or adjusted under 35 U.S.C. 154(b) by 0 days.

(21) Appl. No.: 13/611,988

(22) Filed: Sep. 12, 2012

(65) Prior Publication Data

US 2013/0064747 A1    Mar. 14, 2013

Related U.S. Application Data

(63) Continuation-in-part of application No. 13/396,411, filed on Feb. 14, 2012.

(60) Provisional application No. 61/471,238, filed on Apr. 4, 2011.

(51) Int. Cl.
*B01D 53/22* (2006.01)
*B01D 71/02* (2006.01)

(52) U.S. Cl.
USPC ............... 95/45; 95/51; 96/4; 96/11; 96/12; 502/4; 502/64; 423/702; 423/709; 427/372.2

(58) Field of Classification Search
USPC ........... 95/45, 51; 96/4, 10, 11, 12; 502/4, 60, 502/62, 64; 423/702, 709, 210, 230; 427/372.2
See application file for complete search history.

(56) References Cited

U.S. PATENT DOCUMENTS

| | | | |
|---|---|---|---|
| 6,953,493 B2 | 10/2005 | Nakayama et al. | |
| 7,014,680 B2 | 3/2006 | Nakayama et al. | |
| 7,973,090 B2 | 7/2011 | Suzuki et al. | |
| 2004/0139908 A1 | 7/2004 | Bowe et al. | |
| 2004/0173094 A1* | 9/2004 | Nakayama et al. | 95/45 |
| 2005/0204916 A1* | 9/2005 | Falconer et al. | 95/51 |
| 2005/0233945 A1 | 10/2005 | Brown et al. | |
| 2006/0201884 A1 | 9/2006 | Kulprathipanja et al. | |
| 2007/0022877 A1 | 2/2007 | Marand et al. | |
| 2007/0244347 A1 | 10/2007 | Ying et al. | |
| 2008/0047432 A1* | 2/2008 | Nonaka et al. | 96/11 |
| 2008/0214686 A1* | 9/2008 | Suzuki et al. | 521/27 |
| 2008/0261101 A1 | 10/2008 | de Figueiredo Gomes et al. | |
| 2009/0004084 A1 | 1/2009 | Bell et al. | |
| 2009/0011926 A1 | 1/2009 | Yajima et al. | |
| 2009/0111959 A1* | 4/2009 | Cao et al. | 502/62 |
| 2009/0131643 A1 | 5/2009 | Ni et al. | |
| 2009/0152755 A1 | 6/2009 | Liu et al. | |
| 2009/0155464 A1 | 6/2009 | Liu et al. | |
| 2009/0211440 A1 | 8/2009 | Reyes et al. | |

(Continued)

OTHER PUBLICATIONS

Gies, H., "Studies on Clathrasils. IX—Crystal Structure of DECA-DODECASIL 3R, the Missing Link between Zeolies and Clathrasils", Zeitschrift für Kristallographie, 175 (1986) pp. 93-104.

(Continued)

*Primary Examiner* — Jason M Greene
(74) *Attorney, Agent, or Firm* — Gardere Wynne Sewell LLP; Chris P. Perque; Teresa J. Lechner-Fish

(57) ABSTRACT

DDR nanocrystals of uniform size and structure were synthesized using hydrothermal secondary growth and then used to make DDR zeolite membranes and for any other use where uniform, small DDR zeolite crystals are beneficial.

19 Claims, 12 Drawing Sheets

(56) References Cited

U.S. PATENT DOCUMENTS

| | | | |
|---|---|---|---|
| 2010/0006503 A1* | 1/2010 | Bratton et al. | 210/650 |
| 2010/0132549 A1 | 6/2010 | Yaghi et al. | |
| 2010/0144512 A1 | 6/2010 | Uchikawa et al. | |
| 2011/0160039 A1 | 6/2011 | Himeno et al. | |
| 2011/0298115 A1 | 12/2011 | Celaya et al. | |
| 2011/0319630 A1 | 12/2011 | Yaghi et al. | |
| 2012/0070904 A1 | 3/2012 | Stoddart et al. | |
| 2012/0202006 A1* | 8/2012 | Rimer | 428/131 |

OTHER PUBLICATIONS

Den Exter, M.J. et al. "Separation of Permanent Gases on the All-silica 8-ring Clathrasil DD3R," Zeolites and Related Microporous Materials: State of the Art 1994 1159-1166 (J. Weitkamp, et al., eds. 1994).

Gascon, J., et al., "Accelerated Synthesis of All-silica DD3R and Its Performance in the Separation of Proplyelne/Propane Mixtures". Microporous and Mesoporous Materials, 115(3) (2008) pp. 585-593.

Yang, Q.L., et al., Synthesis of DDR-Type Zeolite in Fluoride Medium. Chinese Journal of Inorganic Chemistry. 25(2) (2009) pp. 191-194.

Tomita, T., et al., "Gas Separation Characteristics of DDR Type Zeolite Membrane." Microporous and Mesoporous Materials. 68(1-3) (2004) pp. 71-75.

Himeno, S., et al., "Characterization and Selectivity for Methane and Carbon Dioxide Adsorpotion on the All-silica DD3R Zeolite." Microporous and Mesoporous Materials, 98(1-3) (2007) pp. 62-69.

International Search Report issued Jul. 12, 2012 for PCT/US2012/025064.

Aguado, Sonia, et al., *Facile synthesis of an ultramicroporous MOF tubular membrane with selectivity towards $CO_2$*, New J. Chem., 2011, 35, pp. 41.

Bae, Tae-Hyun, et al., *A high-performance gas-separation membrane containing submicrometer-sized metal-organic framework crystals*, Angew. Chem. Int. Ed., 2010, 49, pp. 9863-9866.

Baker, Richard W., *Future directions of membrane gas separation technology*, Ind. Eng. Chem. Res., 2002, 41(6), pp. 1393-1411.

Baker, Richard W. and Kaaeid Lokhandwala, *Natural gas processing with membranes: An overview*, Ind. Eng. Chem. Res., 2008, 47(7), pp. 2109-2121.

Brar, Tejinder, et al., *Control of crystal size and distribution of zeolite A*, Ind. Eng. Chem. Res., 2001, 40, pp. 1133-1139.

Bux, Helge, et al., *Oriented zeolitic imidazolate framework-8 membrane with sharp $H_2$ /$C_3$ $H_8$ molecular sieve separation*, Chem. Mater., 2011, 23, pp. 2262-2269.

Bux, Helge, et al., *Zeolitic imidazolate framework membrane with molecular sieving properties by microwave-assisted solvothermal synthesis*, J. Am. Chem. Soc., 2009, 131(44), pp. 16000-16001.

Caro, Jüergen and Manfred Noack, *Zeolite membranes—Recent developments and progress*, Micropor. Mesopor. Mater., 2008, 115, pp. 215-233.

Carreon, Moises A., et al., *Alumina-supported SAPO-34 membranes for $CO_2$/$CH_4$ separation*, J. Am. Chem. Soc., 2008, 130(16), pp. 5412-5413.

Centrone, A., et al., *Growth of metal-organic frameworks on polymer surfaces*, J. Am. Chem. Soc., 2010, 132(44), pp. 15687-15691.

Chen, Banglin, et al., *A microporous metal-organic framework for gas-chronmatographic separation of alkanes*, Agnew. Chem. Int. Ed., 2006, 45, pp. 1390-1393.

Chiu, W. V., et al., *Post-synthesis defect abatement of inorganic membranes for gas separation*, J. Membr. Sci., 2011, 377, pp. 182-190.

Choi, Jungkyu, et al., *Grain boundary defect elimination in a zeolite membrane by rapid thermal processing*, Science, 2009, 325, pp. 590-593.

Cui, Ying, et al., *Preparation and gas separation properties of zeolite T membrane*, Chem. Comm., 2003, 17, pp. 2154-2155.

Cui, Ying, et al., *Preparation and gas separation performance of zeolite T membrane*, J. Mater. Chem., 2004, 14(5), pp. 924-932.

Favre, Eric, *Carbon dioxide recovery from post-combustion processes: Can gas permeation membranes compete with absorption?*, J. Membr. Sci., 2007, 294, pp. 50-59.

Forster, Paul M., et al., *A high-throughput investigation of the role of pH, temperature, concentration, and time on the synthesis of hybrid inorganic-organic materials*, Angew. Chem. Int. Ed., 2005, 44, pp. 7608-7611.

GE, Qinqin, et al., *High-performance zeolite NaA membranes on polymer-zeolite composite hollow fiber supports*, J. Am. Chem. Soc., 2009, 131(47), pp. 17056-17057.

Hao, Ji Hua and Shichang Wang, *Influence of quench medium on the structure and gas permeation properties of cellulose acetate membranes*, J. Appl. Polym. Sci., 1998, 68(8), pp. 1269-1276.

Haque, Enamul, et al., *Synthesis of a metal-organic framework material, iron terephthalate, by ultrasound, microwave, and conventional electric heating: A kinetic study*, Chem. Eur. J., 2010, 16, pp. 1046-1052.

Heng, Samuel, et al., *Low-temperature ozone treatment for organic template removal from zeolite membrane*, J. Membr. Sci., 2004, 243, pp. 69-78.

Himeno, Shuji, et al., *Synthesis and permeation properties of a DDR-type zeolite membrane for separation of CO2/CH4 gaseous mixtures*, Ind. Eng. Chem. Res., 2007, 46(21), pp. 6989-6997.

Huang, Aisheng and Jürgen Caro, *Cationic polymer used to capture zeolite precursor particles for the facile synthesis of oriented zeolite LTA molecular sieve membrane*, Chem. Mater., 2010, 22(15), pp. 4353-4355.

Huang, Aisheng, & Jürgen Caro, *Covalent post-functionalization of zeolitic imidazolate framework ZIF-90 membrane for enhanced hydrogen selectivity*, Angew. Chem. Int. Ed., 2011, 50, pp. 4979-4982.

Huang, Aisheng, et al., *Molecular-sieve membrane with hydrogen permselectivity: ZIF-22 in LTA topology prepared with 3-aminopropyltriethoxysilane as covalent linker*, Angew. Chem. Int. Ed., 2010, 49, pp. 4958-4961.

Huang, Aisheng, et al., *Steam-stable zeolitic imidazolate framework ZIF-90 membrane with hydrogen selectivity through covalent functionalization*, J. Am. Chem. Soc., 2010, 132, pp. 15562-15564.

Husain, S., Mixed Matrix Dual Layer Hollow Fiber Membranes for Natural Gas Purification, Dissertation, Georgia Institute of Technology, Atlanta, GA, 2006, pp. 48-49.

Jang, Kwang-Suk, et al., *Modified mesoporous silica gas separation membranes on polymeric hollow fibers*, Chem. Mater., 2011, 23(12), pp. 3025-3028.

Jee, Sang Eun and David S. Sholl, *Carbon dioxide and methane transport in DDR zeolite: Insights from molecular simulations into carbon dioxide separations in small pore zeolites*, J. Am. Chem. Soc., 2009, 131(22), pp. 7896-7904.

Jie, Xingming, et al., *Gas permeation performance of cellulose hollow fiber membranes made from the cellulose/N-methylmorpholine-N-oxide/$H_2O$ system*, J. Appl. Polym. Sci., 2004, 91, pp. 1873-1880.

Kanezashi, Masakoto, et al., *Gas permeation through DDR-type zeolite membranes at high temperatures*, AIChE J., 2008, 54(6), pp. 1478-1486.

Koros, William J. and Rajiv Mahajan, *Pushing the limits on possibilities for large scale gas separation: Which strategies?*, J. Membr. Sci., 2000, 175(2), pp. 181-196.

Kuhn, Jelan, et al., *Detemplation of DDR type zeolites by ozonication*, Micropor. Mesopor. Mater., 2009, 120, pp. 12-18.

Kumar, P. et al., *Ordered mesoporous membranes: Effects of support and surfactant removal conditions on membrane quality*, J. Membr. Sci., 2006, 279, pp. 539-547.

Kusakabe, Katsuki, et al., *Formation of a Y-type zeolite membrane on a porous alpha-alumina tube for gas separation*, Ind. Eng. Chem. Res., 1997, 36(3), pp. 649-655.

Lee, Clare, et al., *Thermodynamic and kinetic factors in the hydrothermal synthesis of hybrid frameworks: Zinc 4-cyclohexene-1,2-dicarboylates*, Chem. Comm., 2006, pp. 2687-2689.

Li, Shiguang, et al., *Scale-up of SAPO-34 membranes for $CO_2$/$CH_4$ separation*, J. Membr. Sci., 2010, 352, pp. 7-13.

Li, Yan-Shuo, et al., *Molecular sieve membrane: supported metal-organic framework with high hydrogen selectivity*, Angew. Chem. Int. Edit., 2010, 49, pp. 548-551.

(56) References Cited

OTHER PUBLICATIONS

Li, Zong-Qun, et al., *Ultrasonic synthesis of the microporous metal-organic framework $Cu_3(BTC)_2$ at ambient temperature and pressure: An efficient and environmentally friendly method*, Mater. Lett., 2009, 63, pp. 78-80.

Lin, Zhoujia, et al., *Chiral induction in the ionothermal synthesis of a 3-D coordination polymer*, J. Am. Chem. Soc., 2007, 129(16), pp. 4880-4881.

Lindmark, Jonas and Jonas Hedlund, *Modification of MFI membranes with amine groups for enhanced $CO_2$ selectivity*, J. Mater. Chem., 2010, 20(11), pp. 2219-2225.

Liu, Xin-Lei, et al., *An organophilic pervaporation membrane derived from metal-organic framework nanoparticles for efficient recovery of bio-alcohols*, Angew. Chem. Int. Ed., 2011, 50, pp. 10636-10639.

Liu, Yunyang, et al., *Synthesis and characterization of ZIF-69 membranes and separation for $CO_2/CO$ mixture*, J. Membr. Sci., 2010, 353, pp. 36-40.

Liu, Yunyang, et al., *Synthesis of highly c-oriented ZIF-69 membranes by secondary growth and their gas permeation properties*, J. Membr. Sci., 2011, 379, pp. 46-51.

Ma, Bao-Qing, et al., *Microporous pillared paddle-wheel frameworks based on mixed-ligand coordination coordination of zinc Ions*, Inorg. Chem., 2005, 44(14), pp. 4912-4914.

Matsuda, H., et al., *Improvement of ethanol selectivity of silicalite membrane in pervaporation by silicone rubber coating*, J. Membr. Sci., 2002, 210(2), pp. 433-437.

McCarthy, Michael C., et al., *Synthesis of zeolitic imidazolate framework films and membranes with controlled microstructures*, Langmuir, 2010, 26(18), pp. 14636-14641.

Nair, Sankar, et al., *Separation of close boiling hydrocarbon mixtures by MFI and FAU membranes made by secondary growth*, Micropor. Mesopor. Mater., 2001, 48, pp. 219-228.

Pachfule, Pradip, et al., *Solvothermal synthesis, structure, and properties of metal organic framework isomers derived from a partially fluorinated link*, Cryst. Growth Des., 2011, 11, pp. 1215-1222.

Pan, Long, et al., *Microporous metal organic materials: Promising candidates as sorbents for hydrogen storage*, J. Am. Chem. Soc., 2004, 126(5), pp. 1308-1309.

Pan, Yichang & Lai, Zhiping., *Sharp separation of $C_3/C_3$ hydrocarbon mixtures by zeolitic imidazolate framework-8 (ZIF-8) membranes synthesized in aqueous solutions*, Chem. Commun., 2011, 47, pp. 10275-10277.

Parikh, Atul N., et al., *Non-thermal calcination by ultraviolet irradiation in the synthesis of microporous materials*, Micropor. Mesopor. Mater., 2004, 76, pp. 17-22.

Qiu, Wulin, et al., *Dehydration of ethanol-water mixtures using asymmetric hollow fiber membranes from commercial polyimides*, J. Membr. Sci., 2009, 327, pp. 96-103.

Ranjan, Rajiv and Tsapatsis, Michael, *Microporous metal organic framework membrane on porous support using the seeded growth method*, Chem. Mater., 2009, xxx(xx), 000-000.

Sommer, Stefan and Thomas Melin, *Influence of operation parameters on the separation of mixtures by pervaporation and vapor permeation with inorganic membranes. Part 1: Dehydration of solvents*, Chem. Eng. Sci., 2005, 60, pp. 4509-4523.

Van Den Bergh, Johan, et al., *Modeling permeation of $CO_2/CH_4$, $N2/Ch_4$, and $CO_2/air$ mixtures across a DD3R zeolite membrane*, J. Phys. Chem., 2010, C, 114(20), pp. 9379-9389.

Van Den Bergh, J., et al., *Separation and permeation characteristics of a DD3R zeolite membrane*, J. Membr. Sci., 2008, 316, pp. 35-45.

Venna, Surendar R. and Moises A. Carreon, *Highly permeable zeolite imidazolate framework-8 membranes for $CO_2/CH_4$ separation*, J. Am. Chem. Soc., 2010, 132(1), pp. 76-78.

Watanabe, Taku, et al., *Computational identification of a metal organic framework for high selectivity membrane-based $CO_2/CH_4$ separations: $Cu(hfipbb)(H_2hfipbb)_{0.5}$*, Phys. Chem. Chem. Phys., 2009, 11, pp. 11389-11394.

Weh, K., et al., *Permeation of single gases and gas mixtures through faujasite-type molecular sieve membrances*, Micropor. Mesopor. Mater., 2002, 54, pp. 27-36.

Xomeritakis, George, et al., *Transport properties of alumina-supported MFI membranes made by secondary (seeded) growth*, Micropor. Mesopor. Mater., 2000, 38, pp. 61-73.

Xu, Gengsheng, et al., *Preparation of ZIF-8 membranes supported on ceramic hollow fibers from a concentrated synthesis gel*, J. Membr. Sci., 2011, 385-386, pp. 187-193.

Yaghi, Omar M., et al., *Reticular synthesis and the design of new materials*, Nature, Jun. 12, 2003, 423, pp. 705-714.

Yan, Yushan, et al., *Preparation of highly selective zeolite ZSM-5 membranes by a post-synthetic coking treatment*, J. Membr. Sci., 1997, 123(1), pp. 95-103.

Yao, Jianfeng, et al., *Contra-diffusion synthesis of ZIF-8 films on a polymer substrate*, Chem. Comm., 2011, 47, pp. 2559-2561.

Yoo, Won Cheol, et al., *High-performance randomly oriented zeolite membranes using brittle seeds and rapid thermal processing*, Angew. Chem. Int. Ed., 2010, 49, pp. 8699-8703.

Zhang, Yanfeng, et al., *Blocking defects in SAPO-34 membranes with cyclodextrin*, J. Membr. Sci., 2010, 358, pp. 7-12.

Zheng, Zhenkun, et al., *Synthesis, characterization and modification of DDR membranes grown on alpha-alumina supports*, J. Mater. Sci., 2008, 43, pp. 2499-2502.

International Search Report issued Feb. 23, 2012 for PCT/US2011/047769.

International Search Report issued May 25, 2012 for PCT/US2012/025080.

International Search Report issued Nov. 6, 2012 for PCT/US2012/054817.

International Search Report issued Oct. 18, 2013 for PCT/US2013/042075.

Li, Zong-Qun, et al., *Fabrication of nanosheets of a fluorescent metal-organic framework[Zn(BDC)(Hhd 2O)]$_n$ (BDC = 1,4-benzenedicarboxylate): Ultrasonic synthesis and sensing of ethylamine*, Inorganic Chemistry Communications, 2008, 11(11), pp. 1375-1377.

Yang, Lisha and Huimin Lu, *Microwave-assisted ionothermal synthesis and characterization of zeolitic imidazolate framework-8*, Chinese J. Chem., 2012, 30, pp. 1040-1044.

Nov. 20, 2013 Notice of Allowability mailed for U.S. Appl. No. 13/399,645, filed Feb. 17, 2012.

\* cited by examiner

US 8,673,057 B2

ZEOLITE DDR MEMBRANES

PRIOR RELATED APPLICATIONS

This application is a continuation-in-part of U.S. patent application Ser. No. 13/396,411, filed on Feb. 4, 2012, which claimed priority to U.S. Provisional Patent Application Ser. No. 61/471,238, filed on Apr. 4, 2011 for "Zeolite DDR Membranes," each expressly incorporated by reference herein in their entirety.

FEDERALLY SPONSORED RESEARCH STATEMENT

Not applicable.

FIELD OF THE INVENTION

New methods for synthesizing DDR zeolite nanocrystals (200-2000 nanometers in size) are disclosed using hydrothermal secondary growth (seeded growth). By changing the ratio of silica to water, the synthesis temperature, and the mineralizing agents, the morphology and size of the crystals can be manipulated. Specifically, crystals with morphology of hexagonal plates, octahedral, and diamond-like plates are disclosed.

Such crystals can be used as seed coatings for DDR membrane growth on various substrates, and for the fabrication of mixed matrix membranes, membranes on porous substrates, among other uses. Post-treatment with PDMS solution can be used to seal membrane defects, if any, and the membranes can be used for any small molecule liquid or gas separations, or gas storage, catalysis, and the like.

Resulting membranes also have demonstrated acid stability combined with the low $H_2S/CH_4$ and higher $CO_2/CH_4$ selectivities, indicating a use for selective $CO_2$ removal from acid gas-loaded natural gas, and possibly the separation of other gas pairs in acidic environments.

BACKGROUND OF THE INVENTION

The term "zeolite" was originally coined in 1756 by Swedish mineralogist Axel Fredrik Cronstedt, who observed that upon rapidly heating the material stilbite, it produced large amounts of steam from water that had previously been adsorbed into the material. Based on this, he called the material zeolite, from the Greek zeo, meaning "boil" and lithos, meaning "stone".

We now know that zeolites are microporous, aluminosilicate or silicate minerals. As of November 2010, 194 unique zeolite frameworks have been identified (DDR being one of them), and over 40 naturally occurring zeolite frameworks are known. Some of the more common mineral zeolites are analcime, chabazite, clinoptilolite, heulandite, natrolite, phillipsite, and stilbite.

Zeolites have a porous structure that can accommodate a wide variety of cations, such as Na+, K+, $Ca^{2+}$, $Mg^{2+}$, and many others. These positive ions are rather loosely held and can readily be exchanged for others in a contact solution.

The regular pore structure and the ability to vary pore size, shape and chemical nature makes zeolites very useful as molecular sieves. Depending on their structure and composition, zeolites can separate molecules based on adsorption and/or diffusion of certain molecules preferentially inside the pores or exclusion of certain molecules based on their size. The pore size is typically less than 2 nm and comparable to that of small molecules, allowing the use of zeolites to separate lightweight gases such as $CO_2$ and $CH_4$.

The maximum size of a species that can enter the pores of a zeolite is controlled by the dimensions of the channels in the zeolite. These are conventionally defined by the ring size of the aperture, where, for example, the term "8-ring" refers to a closed loop that is built from 8 tetrahedrally coordinated silicon (or aluminum) atoms and 8 oxygen atoms. The rings are not always symmetrical due to a variety of effects, including strain induced by the bonding between units that are needed to produce the overall structure, or coordination of some of the oxygen atoms of the rings to cations within the structure. Therefore, the pores in many zeolites are not cylindrical. The DDR (aka Deca-dodecasil 3R) zeolite of this invention has an 8-ring pore structure (see FIG. 1).

Thus, zeolites are widely used in industry for water purification, as petrochemical production catalysts, and in nuclear reprocessing. Their biggest use by volume is in the production of laundry detergents, and they are also used in medicine and in agriculture.

In particular, zeolites have been used in two types of molecular sieving membranes: mixed matrix membranes and pure zeolite membranes. To fabricate a mixed matrix membranes, zeolite crystals are first dispersed in a polymer solution. The dispersion is then cast into a film or spun into a tubular hollow fiber. Since the membrane thickness is desired to be less than 1 micron, it is necessary to have submicron zeolite particles.

In pure zeolite membrane fabrication, zeolite crystals are first deposited as a "seed" coating on a porous substrate and then grown into a thin continuous layer known as a zeolite membrane. The porous substrate provides mechanical stability for the membrane. In this approach crystals with submicron size are also preferred because the seed coatings will then be tightly packed and of high quality. Further, membrane thickness is ideally about 0.5-5 μm.

Among the various zeolite materials, DDR is a pure silica ($SiO_2$) zeolite. The pore system comprises relatively large (19-hedral) cages interconnected through 8-ring windows with aperture approximately 3.6×4.4 Å. Due to its relatively small pore size, DDR can be used to separate light gases, such as $CO_2$ (kinetic diameter=3.3 angstroms) from $CH_4$ (diameter=3.8 angstroms). Other advantages of DDR zeolites include high thermal stability and chemical resistance due to the pure silica composition.

DDR zeolite crystals were first synthesized in 1986 and the synthesis was further developed by several researchers. These synthesis methods either take a long time (9-25 days) or produce very large crystals (20 to 50 micrometers).

With the exception of a DDR membrane investigated for $H_2/CO_2$ separation by Zheng [21] and a DDR membrane for investigation of gas diffusion at high temperature by Kanezashi [22], to date the DDR membranes reported in the literature are those synthesized by researchers at NGK Corporation.

DDR membranes were first reported in 2004 [23] by Tomita et al, who used a seeded-growth method [24]. Large DDR crystals were first synthesized and ground into smaller 'seed' particles, which were dispersed on a α-alumina tubular support by immersing it into a seed particle suspension. The seeded tubes were then used to grow a DDR membrane by hydrothermal treatment. For equimolar $CO_2/CH_4$ binary mixtures, the $CO_2$ selectivity and permeance were only 220 and 7×10-8 mol/m2.s.Pa (209 GPU) at 301 K and a feed pressure of 0.5 MPa.

U.S. Pat. No. 6,953,493 and U.S. Pat. No. 7,014,680 by NGK Corp. teach the basic method of forming DDR zeolite membranes by mixing seed crystal into a growth solution, applying to the porous substrate, and growing a membrane thereon by hydrothermal synthesis. The seed crystals used therein were produced by grinding to 5 um, and thus do not have a regular, repeatable morphology, nor can it enter the pores of most porous substrates, thus weakening the resulting membrane. Thus, the use of ground material as seed crystals is clearly less than optimal.

US2009011926, also by NGK Corp., teaches a similar method. Here, a 300 nm seed crystal can be either dispersed in the growth solution or previously applied to the pores of the substrate. However, the seed crystals were prepared by pulverizing crystals, and thus although smaller, still suffer from the lack of uniform morphology.

Himeno et al further investigated the membrane performance at higher pressure and with impurities present in the feed stream [18]. The membrane had a $CO_2$ selectivity and permeance of 80 and $1.1 \times 10-7$ mol/m2.s.Pa (329 GPU) at 298 K and 3 MPa feed pressure. While the permeance of $CH_4$ was not affected by water vapor, the presence of 3% water in the gas stream reduced the $CO_2$ permeance to half of that for a dry feed stream, resulting in a 50% reduction in the $CO_2/CH_4$ selectivity. Other impurities such as $N_2$ and $n-C_3H_8$ had negligible effects on the performance.

US2010144512, also by NGK Corp., teaches a method for producing a DDR type zeolite membrane by immersing a porous substrate having a DDR type zeolite seed crystal adhered thereon, in growth solution to grow the membrane, and a burning step of heating the precursor at 400 DEG C. or above and at 550 DEG C. or below to burn and remove the 1-adamantaneamine contained in the DDR type zeolite membrane. However, as above, the seed crystal is produced by grinding and suffers the same disadvantages.

US2010298115 by NGK offers another method. The method forms DDR zeolite membrane containing 1-adamanthanamine on a surface of the porous substrate by subjecting a DDR zeolite to hydrothermal synthesis in the presence of DDR zeolite seed crystals, applying a glass paste onto the surface of the porous substrate so as to contact the membrane, and heating the membrane to burn away the 1-adamanthanamine contained in the membrane and melting the glass paste to form a membrane-like glass seal contacting the membrane on the surface of the porous substrate. Again, the seed crystals used herein are produced by pulverizing.

US2011160039 by NGK teach a method including forming a surface layer by attaching a low polar polymer on a first surface of a porous substrate to cover the surface, a filling step for filling a masking polymer into pores in the porous substrate from a surface different from the first surface of the porous substrate up to the surface layer by impregnating the porous substrate with the masking polymer and solidifying the masking polymer, and a surface layer removing step for removing the surface layer. After the surface layer removing step, a zeolite membrane is formed on the first surface of the porous substrate. The seed crystal is again produced by grinding, but is preferably small enough to enter the pores of the support.

However, there is no prior art on the synthesis of nanosized (i.e., sub-micron) DDR crystals of uniform shape and size, which are critical in fabricating high-quality membranes. In this disclosure, methods for synthesizing nanometer to micron size DDR zeolite crystals are described. Not only can the size and shape of the DDR crystal be controlled, but the synthesis time is significantly shortened. Thus, the methods and compositions described herein are a significant improvement on the prior art. Furthermore, membranes made with such crystals are much improved over the prior art membranes.

SUMMARY OF THE INVENTION

The present invention describes a technique to synthesize DDR zeolite crystals with size in the range of <1 micron (e.g., nanosized) and with control over the morphology and size of the crystals. The synthesis is carried out using seed growth under hydrothermal conditions with mixing. The raw materials solution contains organic template 1-Adamantanamine (ADA), a silica source such as Ludox AS-30 colloidal silica ($SiO_2$), Deionized water (DI), and Potassium Fluoride (KF) and optionally other cations, such as $K^+$, $Na^+$, $Ca^{2+}$, $Mg^{2+}$ and others, can be added to fine tune the zeolites.

The invention also describes the use of the above made crystal to make DDR membranes for use in various applications, in particular small molecule separations in liquids or gases. Post-treatment with PDMS solution to seal membrane defects is also shown.

In a further embodiment, we demonstrated the $H_2S$ stability of DDR, thus, the invention has applicability, not only in various sieving applications, such as the separation of $CO_2$ and other gases, but has application for selective $CO_2$ removal from acid gas-loaded natural gas.

In further detail, submicron DDR crystals of tunable shape and size were successfully synthesized and characterized with scanning electron microscopy (SEM), dynamic light scattering (DLS), X-ray diffraction (XRD), and $N_2$ physisorption. The size of these crystals is tunable in the range of 300-2000 nm by controlling the silica:water ratio, synthesis temperature, and mineralizing agents. This work is summarized in Table 1.

TABLE 1

Summary of particle size of DDR nanocrystals with corresponding experimental conditions

| Crystal Shape | Average Size† (nm) | Poly-dispersity Index (PDI) | BET Surface Area ($m^2/g$) | Pore Volume (cc/g) | Synthesis Conditions ||||
|---|---|---|---|---|---|---|---|---|
| | | | | | T (° C.) | $H_2O/SiO_2$ | Time (hrs) | Additives |
| Octahedron | 2000§ | unknown | 348.0 | 0.124 | 160 | 40 | 48 | n/a |
| Prism | 398 | 0.075 | 371.6 | 0.132 | 160 | 60 | 6 | |
| Octahedron | 366 | 0.034 | 346.2 | 0.123 | 150 | 60 | 6 | |
| Hexagonal Plate | 484 | 0.055 | 356.3 | 0.126 | 150 | 60 | 6 | KOH |

†Hydrodynamic diameter from DLS.
§Estimated from SEM image only, not from DLS.

Nanosized crystals were then used to prepare dense seed layers on porous ceramic supports. The seeded growth of DDR membranes was first optimized on α-alumina disk supports and successfully transferred to tubular supports. Membranes on disk supports suffered from crack formation during calcination. However, DDR membranes on tubular supports did not show significant cracking after calcination, and consistently displayed a $CO_2/CH_4$ selectivity of 5-10. However, the selectivity could be further improved by a post-treatment with polydimethylsiloxane (PDMS) under a pressure differential.

The post-treated membranes showed single gas $CO_2/CH_4$ selectivities of 120-250 at 0.2 MPa and 25° C. while maintaining a high $CO_2$ permeability. Binary $CO_2/CH_4$ selectivities of ~150 were consistently observed at 25° C. and 0.2 MPa, and the selectivities leveled off to ~40 at higher pressures. The $CO_2$ permeance of the post-treated membranes was in the range of 60-85 GPU over the region of pressures investigated. Furthermore, permeation measurements with $H_2S/CH_4$ mixtures showed that the post-treated membranes maintained low $CH_4$ permeability and remained stable under exposure to significant $H_2S$ feed concentrations (~3.5 vol %).

Thus, one embodiment of the present invention discloses a method for preparing DDR membranes on a porous substrate by first seeding the porous substrate with seed DDR zeolite crystals. These crystals are of uniform structure and size and are in the range of 200-600 nm. Once seeded, the DDR zeolite membrane is grown in an incubator using a growth solution. This solution is about 6 ADA:100 $SiO_2$:4000 $H_2O$:x KF, where x is 600-100. The mixture is incubated at 155-165° C. for about 12-48 hours. The resulting DDR zeolite membrane can, optionally, be calcined at temperatures of 500-700° C. for 6-24 hours. Also, any defects in the DDR zeolite membrane can, optionally, be sealed by incubating with a polydimethylsiloxane solution under a pressure differential. The resulting DDR zeolite membranes can be washed after the incubation periods.

Many different porous supports can be seeded by DDR zeolite crystals. Either organic or inorganic porous supports are feasible as long as the porosity is between 10 and 60% and the pores sizes are 200-500 nm.

In one embodiment, the porous support can be α-alumina. In particular, tubular α-alumina having a porosity of 10-50% and a pore size of 100-400 nm is a possible porous support. In yet another variation, tubular α-alumina with a porosity of 30% and a pore size of 100-400 nm can be used.

Additional porous support include, but is not limited to, polypropylene, polyethylene, polytetrafluoroethylene, polysulphone, polyimide, silica, alpha-alumina, gamma-alumina, mullite, zirconia, titania, yttria, silicon nitride, silicon carbide, iron, bronze and stainless steel, glass, and carbon.

When calcining the DDR zeolite membrane, temperatures of 500-700° C. for 6-24 hours work well. More particularly, the DDR zeolite membranes can be calcined at 700° C. for 8 hours.

When choosing the PDMS solution, the PMDS must have a kinetic diameter larger than the pores on the porous support. This will prevent the PDMS from entering pores under vacuum. Thus, PDMS only enters the defects. A 2-20 wt % PMDS solution can be used to seal defects. In one embodiment, tubular α-alumina is sealed using a 2-20 wt % PMDS solution while a vacuum is applied with the inner bore of the porous support. The tubular α-alumina can then be heat cured. In another embodiment, tubular α-alumina is sealed in a 5% PDMS in n-heptanes sealing step for 5-20 minutes as a vacuum is applied to the inner bore of the tubular α-alumina. The porous surface can then be cured by heating to 80° C. for about 4 hours.

Other embodiments include using a sealed DDR zeolite membrane, regardless of whether the optional calcining is performed, to separate mixtures of small molecules. Small molecules capable of being separated include, but are not limited to $CO_2$, $CH_4$, $N_2$, $O_2$, $C_2H_4$, $C_2H_6$, $C_3H_6$, $C_3H_8$. In particular, $CO_2$ can be separated from a mixture of these small molecules.

The "nanosized" or "nanocrystal" as used herein means having an average size of less than 1 micron, e.g., in the nanometer sized range, preferably 200-500.

The term "uniform crystal structure" as used herein means that 80% of the crystals have the same shape, preferably 90-95%, or even 98-99%. Exemplary structures are octahedral, diamond or prismatic, or hexagonal plate, as shown in the photographs of FIG. 2.

The term "uniform size" as used herein means that the crystal have the same size plus or minus 20%, preferably +/−10%, more preferred +/−5%.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is a closed linking verb, and does not allow the inclusion of other elements.

The phrase "consisting essentially of" occupies a middle ground, and does not allow the inclusion of other material elements, but allows the inclusion of non-material elements that do not materially change the invention, such as different buffers, salts, drying steps, rinsing steps, re-precipitation steps, post-synthesis steps, and the like.

The following abbreviations are used herein:

| | |
|---|---|
| ADA | 1-Adamantanamine |
| BET surface area | BET theory aims to explain the physical adsorption of gas molecules on a solid surface and serves as the basis for the measurement of the specific surface area of a material. In 1938, Stephen Brunauer, Paul Hugh Emmett, and Edward Teller published an article about the BET theory in a journal for the first time; "BET" consists of the first initials of their family names. Methods of calculating same are provided in the literature (e.g., en.wikipedia.org/wiki/BET_theory) |
| DDR | Refers to a type of silica zeolite with an 8 ring structure, as shown in FIG. 1. |
| DI | Deionized water |
| DLS | Dynamic light scattering |

| | -continued |
|---|---|
| GPU | gas permeation unit (cm² · s · cm of Hg) X = 3.348 × 10⁻¹⁰ mol/m² · s · Pa) at 295 K and 224 kPa pressure differential |
| HR | Hour(s) |
| KF | Potassium Fluoride |
| KOH | Potassium hydroxide |
| PDI | Polydisperity index—a measure of the distribution of molecular mass in a given polymeric sample. The PDI calculated is the weight average molecular weight divided by the number average molecular weight. It indicates the distribution of individual molecular masses in a batch of polymers. The PDI has a value equal to or greater than 1, but as the polymer chains approach uniform chain length, the PDI approaches unity. PDI was measured herein by DLS, which gives the size distribution, from which we get the average size and PDI. |
| PDMS | Polydimethylsiloxane |
| psia | pounds per square inch absolute |
| sccm | standard cubic centimeter per minute |
| SEM | Scanning electron micrograph |
| SiO₂ | Silica, source Ludox AS-30 colloidal silica |
| XRD | X-Ray Diffraction |

DESCRIPTION OF EMBODIMENTS OF THE INVENTION

Figure 1A:
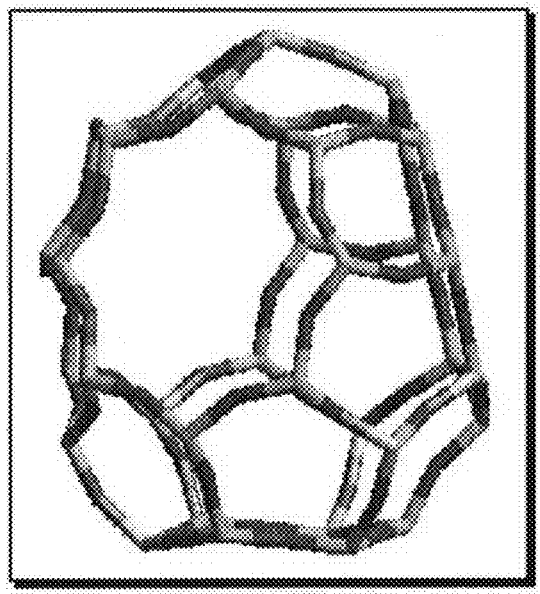
FIG. 1. DDR zeolite structure.

Generally speaking, a method of making DDR zeolite crystals is provided, wherein the method comprises combining 1-adamantanamine ("ADA"), deionized water, a silica source, potassium fluoride ("KF"), and optionally a source of cations. This is mixed for a period of time and then seed crystals are added to said mixture. While continuing to mix, the mixture is heated at 100-200° C. for 4-72 hours to make DDR zeolite crystals of 200-2000 nm. If needed for the application, the crystals can be washed and further calcined to remove the ADA.

In preferred embodiments, the mixture comprises x ADA: 100 SiO2:y KF:z H2O:m KOH, wherein x is between 6 and 50, y is between 50 and 100, z is between 2000 and 14000, and m is between 0 to 2. Further preferred embodiments include, initial mixing between 30 minutes and 6 hours; temperatures of 130-160° C.; heating time between 6 hour and 12 hours.

The invention also includes the various DDR zeolite crystals made according to the above methods, including crystals having the following characteristics: a) size in the range of 200 to 2000 nm, b) a morphology selected from the groups consisting of diamond-like, octahedron, or hexagonal plate, c) a BET surface area in the range of 340 m2/g to 380 m2/g and d) a pore volume from 0.123 to 0.132 ml/g. Also invented are crystals being octahedral of 1000-4000 nm, diamond plate of 200-500 nm, octahedral of 200-500 nm and hexagonal plates, preferably of 200-500 nm. The sizes provided herein are average sizes, and preferably are ±20% and more preferably ±10% or 5%.

The nanosized crystals can be used as seed crystals to grow DDR zeolite membranes on any porous support surface. Seed crystals can be added separately to the porous support, e.g., in a solvent that wets the porous support and will therefor enter the pores of the support. Alternatively, the seed crystals can be drawn into said pores by a pressure differential, e.g., applying a vacuum to a disk or end-sealed tubular support. As yet another alternative, the seed crystals can be suspended in the crystal growth solution, and the porous support immersed therein.

Porous supports can be organic or inorganic. Organic supports include polymers such as polypropylene, polyethylene, polytetrafluoroethylene, polysulphone, polyimide and the like. Inorganic supports include a ceramic sintered body such as silica, alpha-alumina, gamma-alumina, mullite, zirconia, titania, yttria, silicon nitride and silicon carbide, a sintered metal such as iron, bronze and stainless steel, glass, and a carbon molding.

The support preferably has an average pore diameter of 0.05 μm-10 μm, in particular 0.1 μm-2 μm, and a porosity of 10% to 60%, preferably 30% to 50%. The porosity or degree of porosity is understood to be the ratio of the pore volume to the total volume of the support structure. Smaller pore diameters than 0.05 μm are less suitable due to the insufficient permeation flow rates. A porosity of less than 10% also produces a large reduction in the permeation flow rate. If the pore diameter is larger than 10 μm a decrease in selectivity may occur. A porosity of higher than 60% also results in a decrease in selectivity and in the strength of the material. 0.1-0.5, or 0.2-0.3 μm (200-300 nm) may be ideal for certain applications, such as $CO_2$ separations.

The porous support is not subject to any limitations regarding its overall shape or geometry. An advantageous geometry for separation applications consists of tubes or cylinders of a length of 10-100 cm and having an external diameter of at least 10 mm and a tube thickness of at least 0.2 mm to several millimeters. The zeolite layer can be applied to the internal and/or external surface of the tubular support structure, and preferably to the external surface. The porous structure can also be a cylindrical structure having an external diameter of 30-100 mm and a length of 20-100 cm and a large number of longitudinal channels with diameters of 2-12 mm. However, disks, plates, beads, honeycomb structures, and the like may be suitable in certain applications.

The DDR membrane can be made in any known way, including dip coating, and the like, but a preferred method is hydrothermal synthesis, wherein the porous support is placed in a crystal growth solution for a period of time and heat applied, such that crystals are grown thereon.

A crystal growth solution can be about 5-15 ADA, 50-150 $SiO_2$, 3000-5000 $H_2O$ and 50-120 KF. A particularly preferred solution is 6 ADA:100 $SiO_2$:4000 $H_2O$:x KF, wherein x=60-100.

Preferred temperatures are 100-200° C., preferably about 150-170, or 160° C., and deposition time can be increased to increase the thickness of the membrane, as needed, typically from 0.1 μm to 100 μm, preferably 0.5-5 μm.

In addition to changing the crystal growth time and temperature, thickness of the membrane can be modified by changing the $H_2O/SiO_2$ ratio. Thickness can be reduced from more than 10 μm down to 2-3 μm, by increasing the $H_2O/SiO_2$ ratio from 20-120. A further increase in $H_2O/SiO_2$ ratio led to a non-uniform membrane coverage and large defect areas.

The resulting membrane can be modified as desired to tune the membrane, e.g., by chemical vapor deposition, or by exchanging cations or anions therein, by calcining, washing, chemical modification of hydroxyl groups, or any other method.

One preferred post-membrane modification is treatment with a polymer that is larger than the pore size under a pressure differential, such that the polymer seals any defects without damaging the pore structure. One such polymer can be PDMS, but any suitable polymer, such as organosilicon polymers, such as polymeric polysiloxanes, can be used, depending on the ultimate application of the membrane. For example, if the membrane is to be use for small molecule separations in an acidic environment, the polymer chosen should be stable to acid. Likewise, the polymer should be suitable for the temperatures of use.

The following detailed descriptions are illustrative only, and are not intended to unduly limit the scope of the invention.

Seed DDR

Large DDR crystals with octahedron morphology and approximate 2-micron size were synthesized first for use as seed crystals and for comparative purposes. A mixture of ADA, Silica, KF and DI was made with the molar ratio of 6:100:50:8000. ADA was first dissolved in DI water. Due to the low solubility of ADA in water, the mixture was really only partially solubilized and much remained as a suspension of ADA in water. Silica was then added to the suspension and mixed. After mixing the suspension for 5-10 minutes, KF was added to the suspension. The mixture was further mixed at room temperature for 2 hours.

Next, 30 grams of the mixture was poured into an autoclave with a Teflon liner of 45 ml. Then 5-10 grams of seed crystals were added to the autoclave. The autoclave was then sealed and heated to 160° C. inside an oven. The reaction was maintained for 48 hours. The autoclaves were then cooled to room temperature. The crystals were collected and washed with DI water and centrifuged for several times. Some of the crystals were calcined at 700° C. for 8 hours to remove the organic template ADA.

Diamond DDR

Next we synthesized a DDR crystal with diamond-like morphology and approximate 500×250 nanometer size. Generally speaking, decreasing the time of the heat treatment unexpectedly changed the morphology and reduced the size.

In a typical synthesis, a mixture of ADA, Silica, KF and DI was made with the molar ratio of 6:100:50:10000. ADA was first dissolved in DI water. Due to the low solubility of ADA in water, the mixture was actually a partial suspension of ADA in water. Silica was then added to the suspension and mixed. After mixing the suspension for 5-10 minutes, KF was added to the suspension. The mixture was further mixed at room temperature for 2 hours.

After the mixture was prepared, 30 grams of the mixture was poured into an autoclave with a Teflon liner of 45 ml. 5 to 10 grams of seed crystals were added to the autoclave. The autoclave was then sealed and heated up to 160° C. inside an oven. The reaction was maintained for 8 hours. The autoclaves were then cooled to room temperature. The crystals were collected and washed with DI water and centrifuged for several times. Some of the crystals were calcined at 700° C. for 8 hours to remove the organic template ADA.

Octhedral DDR

Next DDR crystals with octahedron morphology and approximately 300 nanometer size were synthesized. Generally, lowering the temperature and heating time reduced crystal size.

In a typical synthesis, a mixture of ADA, Silica, KF and DI was made with the molar ratio of 6:100:50:10000. ADA was first dissolved/suspended in DI water. Silica was then added to the suspension and mixed. After mixing the suspension for 5-10 minutes, KF was added to the suspension. The mixture was further mixed at room temperature for 2 hours.

After the mixture was prepared, 30 grams of the mixture was poured into an autoclave with a Teflon liner of 45 ml. 5 to 10 grams of seed crystals were added to the autoclave. The autoclave was then sealed and heated up inside an oven. To synthesize nanometer sized octahedral DDR nanocrystals, the temperature should be controlled less than or equal to 150° C. The reaction was maintained for 6 hours with rotational mixing. The autoclaves were then cooled to room temperature. The crystals were collected and washed with DI water and centrifuged for several times. Some of the crystals were calcined at 700° C. for 8 hours to remove the organic template ADA.

Hexagonal DDR

Next, we synthesized a DDR crystal with hexagonal plate morphology and about 500 nanometer size. Adding KOH surprisingly changed the crystal structure from octahedral to hexagonal plate.

To synthesize hexagonal plate DDR nanocrystals, a mixture of ADA, Silica, KF and DI was made with the molar ratio of 6:100:50:10000. ADA was first dissolved in DI water. Silica was then added to the suspension and mixed. After mixing the suspension for 5-10 minutes, KF was added to the suspension. 0.28 grams KOH were added to the mixture after adding KF. The mixture was mixed at room temperature for 2 hours.

After the mixture was prepared, 30 grams of the mixture were poured into an autoclave with a Teflon liner of 45 ml. 5 to 10 grams of seed crystals were added to the autoclave. The autoclave was then sealed and heated up inside an oven. The temperature was set at 150° C. and the chambers rotationally mixed, as above. The reaction was maintained for 6 hours. The autoclaves were then cooled to room temperature. The crystals were collected and washed with DI water and centrifuged for several times. Some of the crystals were calcined at 700° C. for 8 hours to remove the organic template ADA.

DDR Membranes

DDR membrane synthesis variations were initially performed on porous α-alumina disks, prepared in-house by a previously reported procedure [30]. The disks were then dip-coated with the seed crystals. A Teflon disk holder was fabricated and used to hold the seeded disk vertically in the Teflon-lined autoclave. A hydrothermal synthesis mixture with molar composition 9 ADA:100 $SiO_2$:4000 $H_2O$:80 KF was prepared and carefully transferred into the reactor. The reactor was placed in an oven and heated at 160° C. for various times. The reactor was then cooled down to room temperature, and the membrane was washed with DI water and dried in an oven at 60° C. for 1 day before characterization.

The synthesis recipe, synthesis time, and temperature were then optimized in detail to obtain the best conditions from which thin and continuous membranes could be synthesized. The final synthesis conditions obtained by experimentation on α-alumina disks are the following: molar composition of 6 ADA:100 $SiO_2$:4000 $H_2O$:x KF, where x=60-100, a temperature of 160° C., and a synthesis time of 36 hours.

The optimized conditions were then used to synthesize membranes on the exterior surface of tubular α-alumina supports, which were obtained from CERAMCO INC. (Center Conway, N.H.). Each tube had a porosity of 30% and a pore size of 200-300 nm. The seeding procedure was similar to that used for the disks. Both ends of the tube were sealed with Teflon tape. After 3 cycles of seed layer coating, the tube supports were hydrothermally treated to grow the membrane layer. The membranes were calcined at 500° C. (disk membranes) and 700° C. (tubular membranes) for 8 hours. The heating and cooling ramp rates were 0.1° C./min and 0.2° C./min, respectively.

A polydimethylsiloxane (PDMS) post-treatment method was developed, based on a preliminary report by Husain on the sealing of pin-holes in polymeric membranes [32], but modified to greatly increase the driving force for penetration of the PDMS into the DDR membrane defects. The most important difference in our method are that we apply a vacuum on the inner bore of the membrane tube. This is important, because the defects/pinholes in the DDR membrane are much smaller than those in polymer membranes and thus require a much larger driving force for the PDMS to successfully penetrate and seal the defects. In contrast, application of Husain's method "as is" did not work.

A 5 wt % PDMS solution in n-heptanes was heated at 90° C. for ~4 hours. The zeolite-coated exterior surface of the α-alumina tube was immersed inside the PDMS solution for 10 minutes, while a vacuum was applied from the inner bore of the tube. The post-treated membrane was cured in an oven at 80° C. for 4 hours.

Characterization

The DDR crystals or membranes were characterized by SEM (LEO 1550), dynamic light scattering (DLS, MALVERN ZETASIZER NANO ZS90), N2 physisorption (MICROMERITICS TRISTAR 3020), XRD (PANALYTICAL X'PERT PRO, Cu Kα radiation), and confocal fluorescence microscopy (ZEISS LSM 510 VIS). Prior to N2 physisorption, the crystals were degassed at 150° C. for 12 hours, and the BET surface area was obtained from the physisorption data in the p/p0 range of 0.05-0.1. The XRD scanning range was 5-20° 2θ with a scanning step of 0.02°. For fluorescence characterization, the membranes were contacted with 0.1 N fluoresin dye solution in a home-made diffusion cell [31]. After 24 hours of impregnation of the dye, the membrane was taken out the cell, rinsed with DI water, and dried with tissue.

Figure 11:
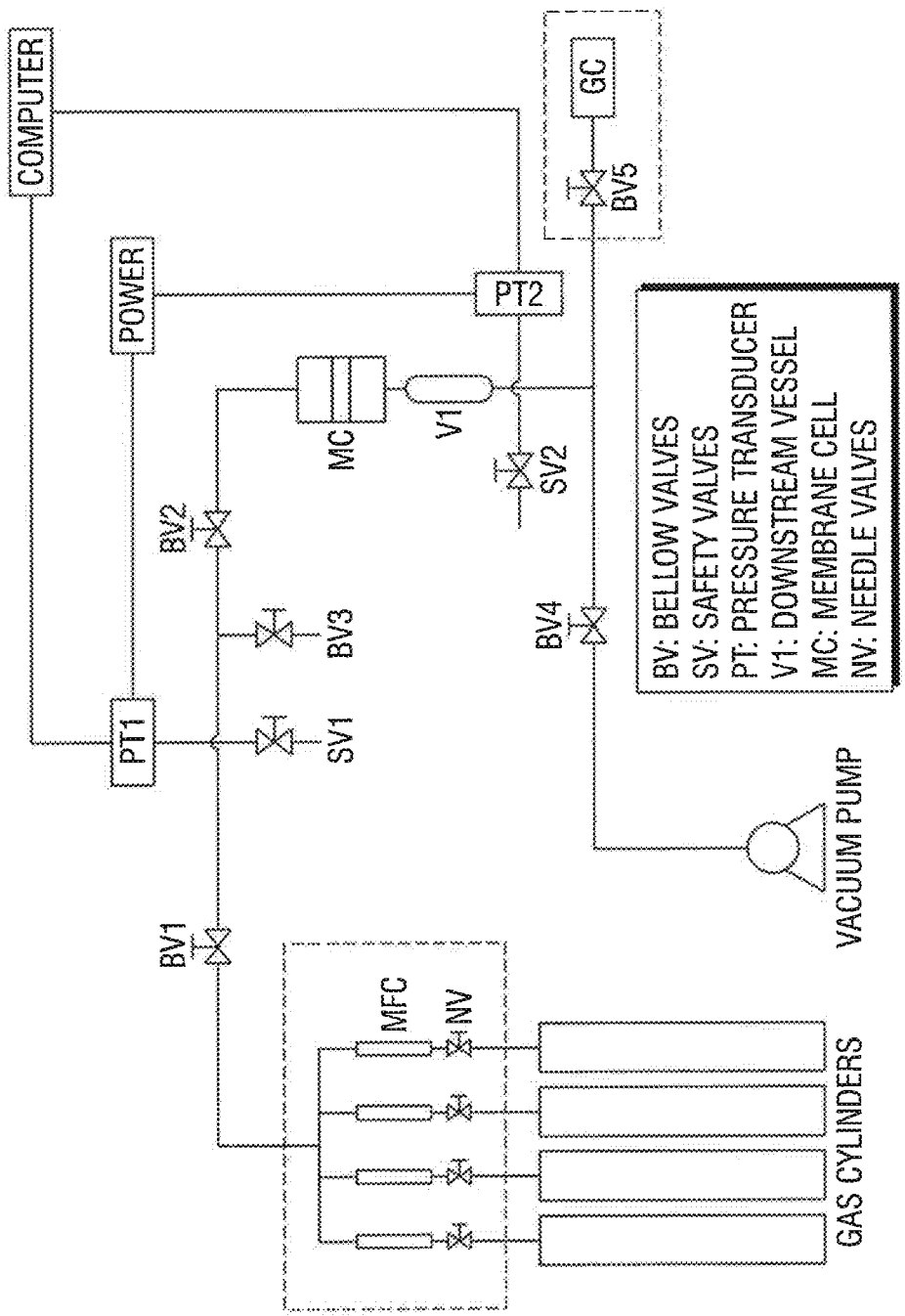
FIG. 11. Schematic diagram of gas permeation setup.

The $CO_2$ and $CH_4$ gas permeation properties of the DDR membranes were characterized with the permeation apparatus shown in FIG. 11. Disk membranes were sealed in a membrane cell with VITON O-rings on both sides, leaving a permeation area of 7.85×10-5 $m^2$. For tube membranes, one end was bonded with epoxy to a Swagelok tube connection and the other end was then sealed with epoxy to create a dead-end geometry on the inner (bore) side, leaving a permeation area of 1.38×10-3 $m^2$.

The feed stream was introduced on the external side. The pressures of feed and permeate streams were recorded with an OMEGA PX309 pressure transducer. The membrane permeation cell was placed inside a temperature-controlled oven. During the permeation experiment, the feed pressure was maintained constant. The permeate side was vacuumed.

Figure 1B:
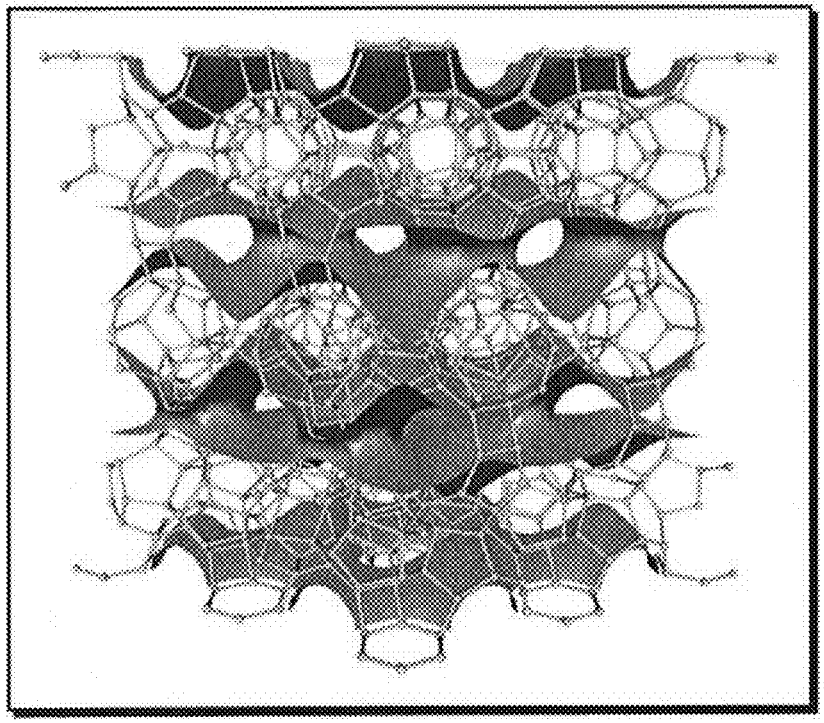

When a steady state was reached, the vacuum pump was isolated and the permeate stream was collected in the downstream volume V1 (FIG. 1). The rise in permeate pressure with time was recorded with an OMEGA QDAQ data acquisition module. The total gas flux was then calculated using the slope of the pressure-time plot. For binary measurements, the composition of the permeate stream was also analyzed by a gas chromatograph (Shimadzu 2014) equipped with a HayeSep N column.

The $H_2S$ and $CH_4$ mixed-gas permeation properties of the DDR membranes were characterized with a permeation apparatus similar in design to the apparatus shown in FIG. 11. The feed stream of ~3.5 vol % $H_2S$ and ~96.5 vol % $CH_4$ was introduced with Brooks mass flow controllers. The pressures of feed and permeate streams were controlled and recorded by Brooks pressure controllers. The membrane permeation cell was placed inside a temperature-controlled oven. During the permeation experiment, the feed pressure was set at the desired value, the permeate side was controlled at 10 psig, and the differential pressure was measured by a Rosemount differential pressure gauge. The composition of the permeate or retentate stream was analyzed by routing it to a gas chromatograph (AGILENT 3000A MICRO GC) equipped with an AGILENT MOLSIEVE 5A column for $CH_4$ measurement and an Agilent HP-Plot U column for $H_2S$ measurement. For the permeate stream, a carrier gas stream of 20 sccm He was used to augment the flow of gas to the GC. When a steady state was reached, the permeate or retentate flow rate was measured by routing the flow through a Ritter wet test meter and measuring for a fixed amount of time (60 and 15 min, respectively).

Results

Figure 2A:
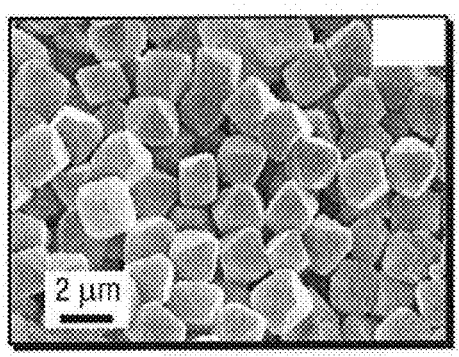
FIG. 2(a) micron-size octahedral, (b) prismatic, (c) submicron octahedral, and (d) hexagonal plate, and (e) Indexed XRD pattern of DDR crystals.
Figure 2B:
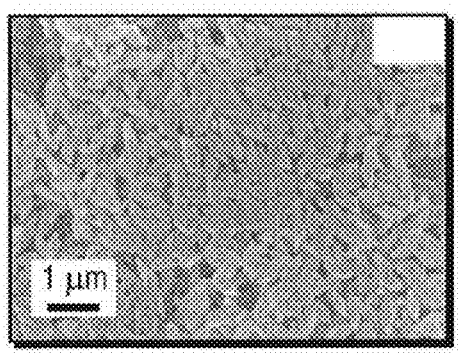
FIG. 2. SEM micrograph of various DDR zeolite crystals of various sizes and morphologies.
Figure 2C:
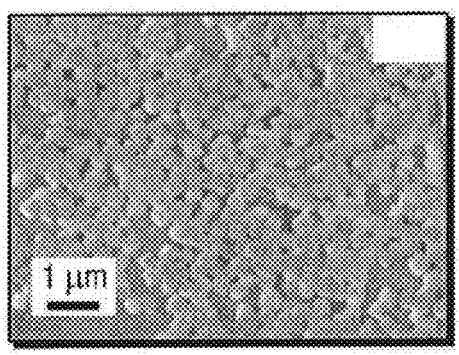
Figure 2D:
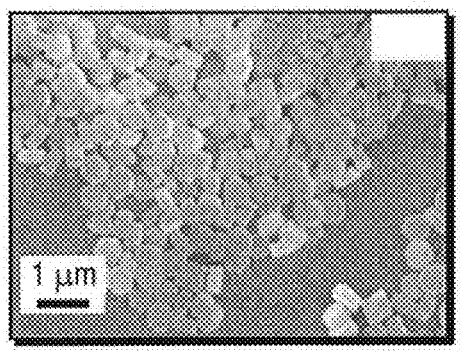

FIG. 2a shows an example of micron-size DDR crystals, whereas FIG. 2b-2d show SEM images of different types of submicron DDR crystals. By varying the reactant concentration, temperature, additives, and synthesis time, uniform DDR particles with morphologies corresponding to prisms, octahedra, and hexagonal plates are obtained. The particle sizes vary from 300-500 nm as measured by DLS and verified by SEM. The XRD patterns of the DDR crystals (FIG. 2e) and their BET surface areas and pore volumes verify their high crystallinities and porosities.

Figure 3A:
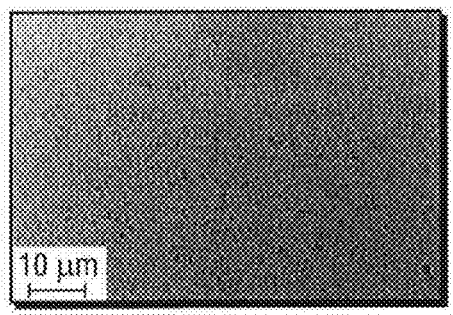
FIG. 3. Seeding of α-alumina disks and synthesis of DDR membranes: (a) Surface of uncoated support, (b) support coated with 366 nm DDR seed crystals, (c) top view of typical DDR membrane, (d)-(g) cross-section views of DDR membranes synthesized with $H_2O/SiO_2$ ratio of 20, 40, 100, and 120, respectively, and (h) XRD pattern of representative DDR membrane.
Figure 3B:
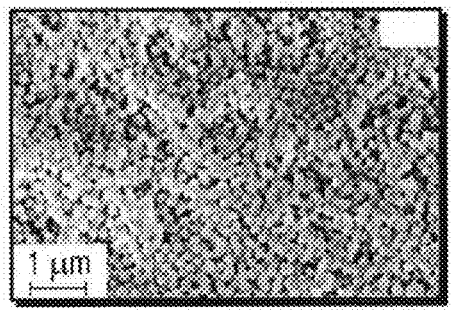
Figure 3C:
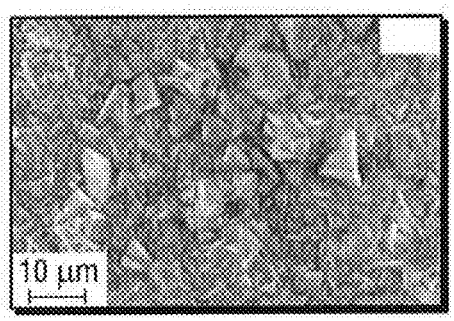
Figure 3D:
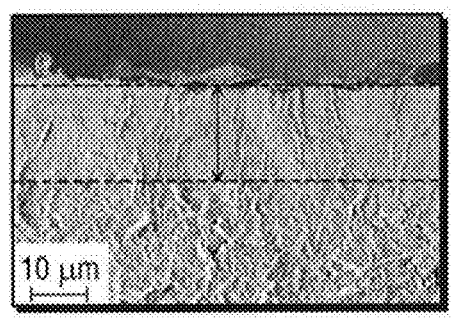
Figure 3E:
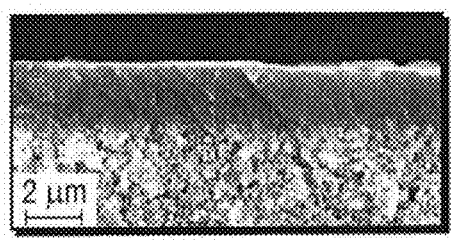
Figure 3F:
Figure 3G:
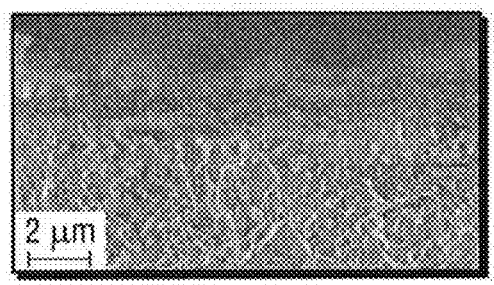

The membrane synthesis using the nanosized crystals from above was first optimized on home-made porous α-alumina disk supports. FIG. 3a shows the surface of a α-alumina support disk, and FIG. 3b shows a uniform coating of 366 nm DDR seed crystals (see FIG. 2c) on these supports. DDR membranes grown at varying conditions from these seed layers are shown in FIG. 3c-3g. FIG. 3c is the top view of a typical membrane before calcination. Continuous, crack-free, and well-intergrown membranes are observed. FIG. 3d-3g show cross-section views of DDR membranes grown from the seed layers on the top of the support disk.

By changing the $H_2O/SiO_2$ ratio in the precursor solution, membranes with different thicknesses can be synthesized. FIG. 3d-3g show that the membrane thickness can be reduced from more than 10 μm down to 2-3 μm, by increasing the $H_2O/SiO_2$ ratio from 20-120. A further increase in $H_2O/SiO_2$ ratio led to a non-uniform membrane coverage and large defect areas.

Figure 2E:
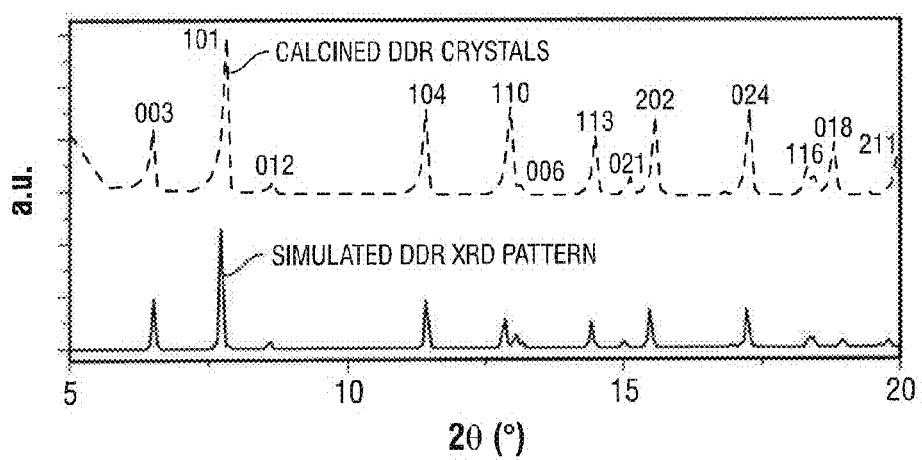
Figure 3H:
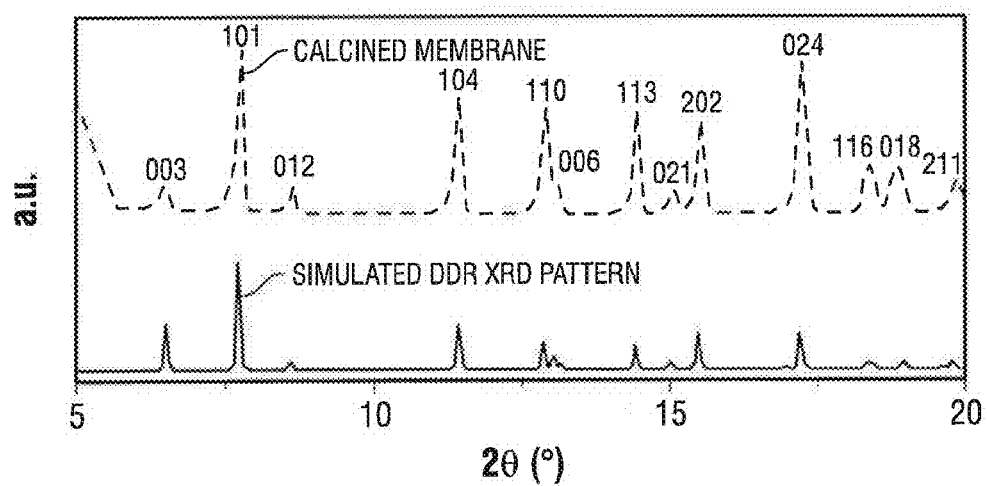
Figure 4A:
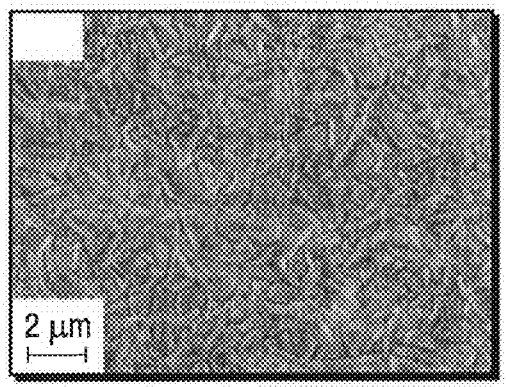
FIG. 4. Characterization of calcined DDR membranes on α-alumina disk supports: (a) SEM micrograph of top view of membrane calcined at 500° C., (b) top view, and (c) cross-section view of calcined membrane via confocal fluorescence microscopy.
Figure 4B:
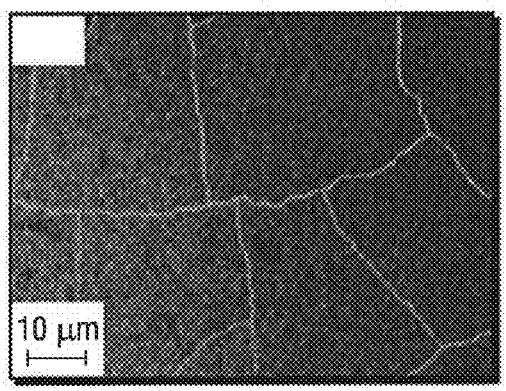
Figure 4C:
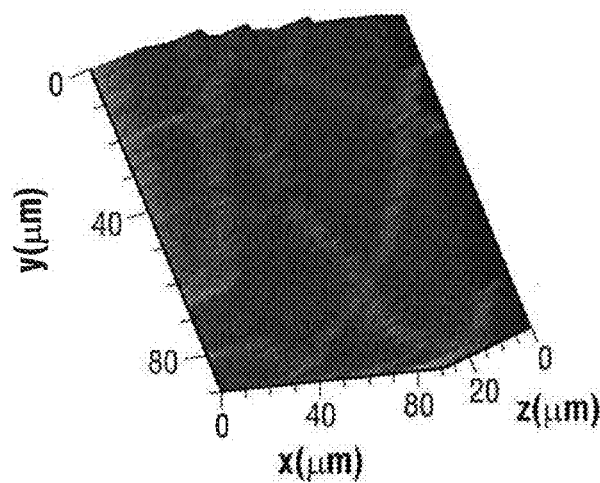

A typical XRD pattern of the DDR membranes is shown in FIG. 3h, showing its high crystallinity and essentially random crystal orientation (compare with FIG. 2e). The $N_2$ permeabilities through the uncalcined membranes were typically about 0.02 Barrer at 25° C., indicating that the membranes were free of large defective areas. However, FIG. 4a shows an SEM micrograph of the DDR membrane after calcination at 500° C. Cracks can be clearly observed throughout the membrane surface, thereby rendering the calcined membrane unselective in gas permeation. Fluorescence confocal microscopy further confirmed that the cracks propagated through the entire membrane layer, as shown in FIG. 4b-4c. The cracks are probably formed due to the difference in thermal expansion between the membrane and the α-alumina support, which leads to an unconstrained stress acting on the planar support surface. Efforts to eliminate the cracks by lowering the calcination temperature or altering the heat-up/cool-down rate during the calcination process were not successful.

In order to minimize the formation of cracks in zeolite membranes, several controlled calcination techniques have been developed [34-36]. Kuhn reported the use of ozone in the calcination of DDR crystals [36]. The low concentration of ozone at higher temperatures makes this technique ineffective in removing the SDA completely from the zeolite pores.

More recently, a rapid thermal processing (RTP) method has been reported to remove the SDA from zeolite MFI membranes [10]. It was postulated that silanol (Si—OH) groups at the grain boundaries of the polycrystalline membrane can be condensed by RTP treatment to form Si—O—Si bonds, and thereby improve the mechanical integrity of the membrane and its resistance to crack formation. The RTP-treated membranes were then calcined using conventional conditions. Membranes with RTP treatment showed a high p-xylene selectivity over o-xylene. Depending on the membrane thickness, RTP could even be used in a single step to remove the SDA from an MFI membrane [37]. However, we found that a range of RTP treatments of DDR membranes produced no improvement in resistance to crack formation during calcination. It is believed that no significant condensation of silanol groups occurred at the grain boundaries of the polycrystalline DDR membrane during RTP treatment, unlike the case of MFI membranes.

Figure 5A:
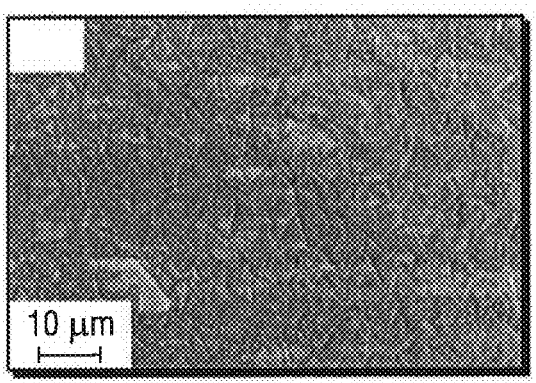
FIG. 5. (a) Top view and (b) cross-section view of DDR membrane on a tubular α-alumina support calcined at 700° C.; and (c) aluminum and silicon distribution in the cross section of the membrane via EDX analysis.
Figure 5B:
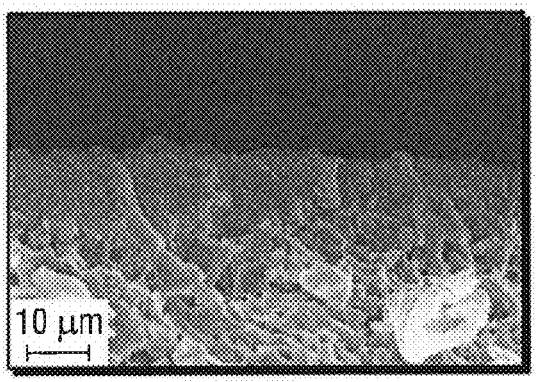

Zeolite membranes on tubular supports have greater technological significance than membranes on disk supports, since they can be scaled-up into shell-and-tube membrane modules. Thus, the DDR membrane synthesis procedure optimized on disk supports was successfully transferred to tubular α-alumina supports. FIG. 5a-5b show a top-view and cross-section view of the DDR membrane grown on the tubular support. The membranes were well-intergrown and 2-3 μm thin.

Figure 5C:
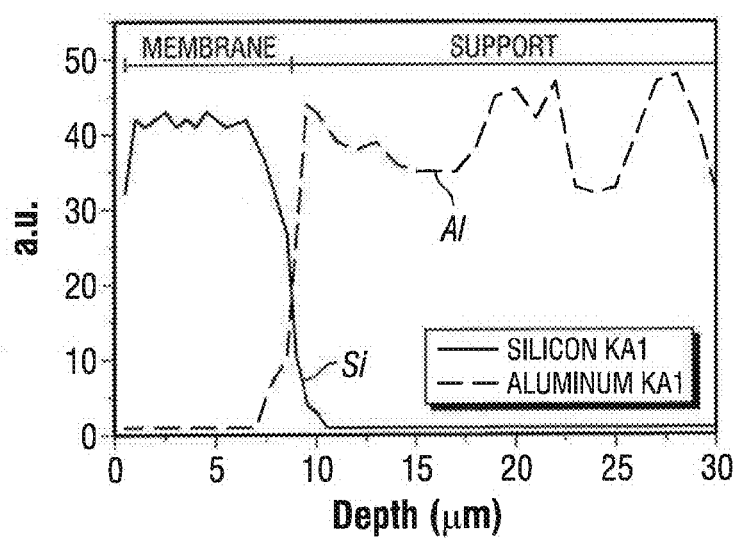

However, the interface between the DDR layer and the alumina support was not as sharp as that observed on disk supports. Indeed, compositional analysis of the cross-section by EDX showed that silicon and aluminum were both present in a ~2.5 μm interfacial region (FIG. 5c).

Interestingly, the tubular DDR membranes did not develop cracks even at high calcination temperatures of 700° C. (FIG. 5a). There are two likely reasons for this phenomenon: firstly, the mechanical strength of the membrane and its adhesion to the support was enhanced due to some penetration of the membrane layer into the tubular support, unlike the case of the disk support; and secondly, due to the cylindrical geometry, there may occur a cancellation of the differential thermal expansion along the circumference of the tube. Previous reports have suggested that the penetration of the membrane layer into the porous support can be beneficial to the mechanical integrity and performance of the membrane [37-39].

Single-component permeation of $CO_2$, $N_2$, $CH_4$, and $SF_6$ through the tubular membranes was measured as a function of temperature and pressure (FIG. 6). For consistency with the polymeric membrane literature, the permeances are expressed only in GPUs (gas permeation units, 1 GPU=3.348×10-10 mol·m-2.s-1·Pa-1).

The $CO_2/CH_4$ ideal selectivity was ~6, which is much lower than expected in DDR. The $CH_4/SF_6$ selectivity (3.2) is only slightly higher than the Knudsen selectivity (3.02), thereby suggesting the presence of mesoscopic defects such as pinholes. Since SF6 (kinetic diameter ~0.55 nm) is much too large to enter the DDR pores at low and moderate pressures, its permeance is almost entirely through Knudsen flow and (potentially) viscous flow through the defects.

Figure 6A:
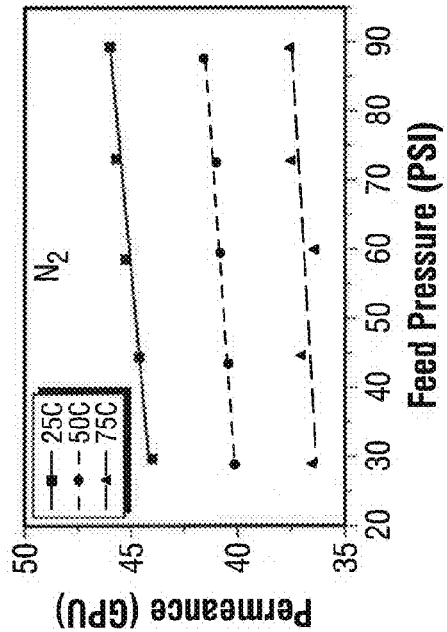
FIG. 6. Temperature and pressure dependence of single-gas permeation through tubular DDR membranes before post-treatment. The lines are a guide to the eye.
Figure 6B:
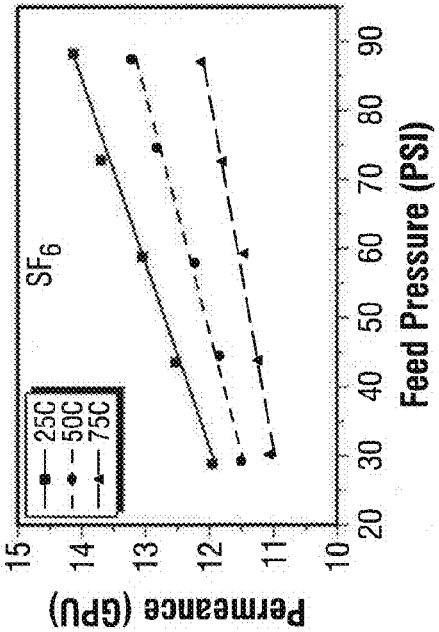
Figure 6C:
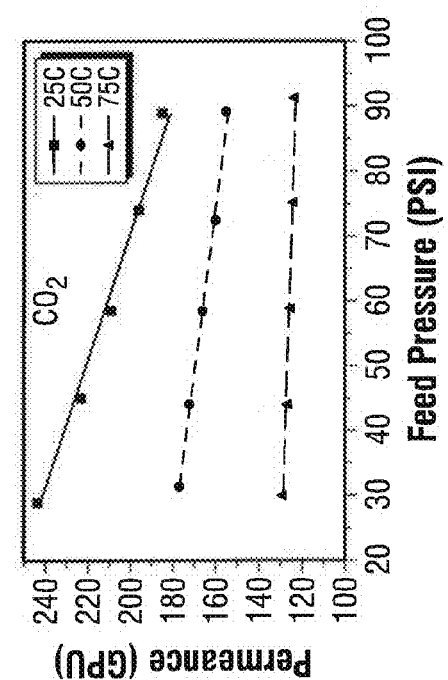
Figure 6D:
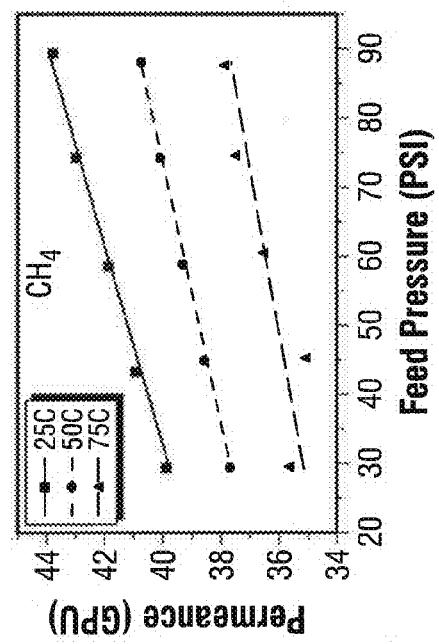

The Knudsen permeance (Pm,Kn) is independent of pressure, whereas the viscous permeance (Pm,vis) is a function of pressure, as shown in Equation (1):

$$P_{m,tot,SF6} = PF_{m,Kn} + P_{m,vis} = \phi_K, 97\sqrt{\frac{\tau}{M}} \frac{r_K}{RTL} + \phi_v \cdot \frac{1}{8} \frac{r_v^2}{\eta RTL} P_{ave} \quad (1)$$

where Kφ and vφ are the fractional surface areas for Knudsen diffusion and viscous flow, respectively; rK and rv are the pore sizes for defects admitting Knudsen and viscous flow, respectively; η is the gas viscosity; and L is the membrane thickness. We can decouple the Knudsen and viscous flow by plotting total permeance (Ptot) against the average pressure (Pave), (the average of the feed and permeate-side pressures). As shown in FIG. 6d, a linear dependence is seen. The intercept and slope yield the Knudsen and viscous flow contributions. In this manner, it was found that almost 95% of the $SF_6$ permeance was due to Knudsen diffusion, and that the contribution of viscous flow was negligible. Therefore, there are no large pin-hole defects in the membrane.

The Knudsen selectivity was calculated for other gases with Equation (2):

$$\alpha_{Kn,gas/SF6} = \sqrt{M_{SF6}/M_{gas}} \quad (2)$$

where M is the molecular weight. Estimates based on Equation (1) showed that for $CH_4$, $N_2$, and $CO_2$, the Knudsen permeance was respectively 90%, 60%, and 10% of the total permeance. This fully explains the low $CO_2/CH_4$ selectivity (5-10) of the membranes. The $CO_2$ mainly permeates through the DDR pores, in which it is much more preferentially adsorbed over $CH_4$ and $N_2$ [19, 25]. As the feed pressure increases, adsorption of $CO_2$ in the zeolite saturates and its permeance decreases. The other gases are not strongly adsorbed in DDR and their permeances are controlled by diffusion through the defects.

By subtracting the permeance contribution of the defects, we can estimate the intrinsic permeance of the different gases through the zeolite membrane and thereby the expected selectivity in a "defect-free" membrane. The intrinsic $CO_2/CH_4$ ideal selectivity was estimated to be at least 40, suggesting that the membranes would have high selectivity if the defects could be sealed by an appropriate post-treatment.

To improve the performance of membranes containing mesoscopic defects, one must selectively seal these defects, whilst leaving the zeolitic pores unaffected. Several methods have been used to treat defective membranes.

Yan et al. used a coking method to treat a MFI membrane for n-butane/i-butane separation [40]. The membrane was impregnated with 1,3,5-triisopropylbenzene (TIPB) for 24 hours and subsequently calcined at 500° C. to pyrolyze TIPB. The size of TIPB (0.84 nm) is larger than the pore size of MFI and it only enters the defects. The selectivity of the membrane increased from 9 to 322.

Zhang et al. recently reported a similar approach to treat SAPO-34 membranes for gas separation [41]. The membrane was soaked in β-cyclodextrin (CD) and dried at 200° C. The $CO_2/CH_4$ selectivity was increased by 150%.

Nair et al. used a silica sol-gel method to seal the defects in an MFI membrane [31]. The treated membrane showed an increase in p-xylene/o-xylene selectivity from 1 to ~100.

Matsuda et al. coated a silicone rubber on an MFI membrane for pervaporative separation of ethanol from water [42]. The ethanol selectivity increased from 51 to 125.

Chiu et al. used PDMS to improve the performance of silica and zeolite Y membranes [43], by forming a PDMS layer on top of the membrane. The selectivity for an equimolar $CO_2/N_2$ gas mixture increased from 1.5 to 835, but the $CO_2$ and $N_2$ permeances decreased by two orders of magnitude.

Although the above methods could potentially be used to treat the defective DDR membranes, they involve additional coating or calcination steps, and may also lead to significant blockage of the zeolite pores. Thus, a simpler, one step method was desired.

Figure 7:
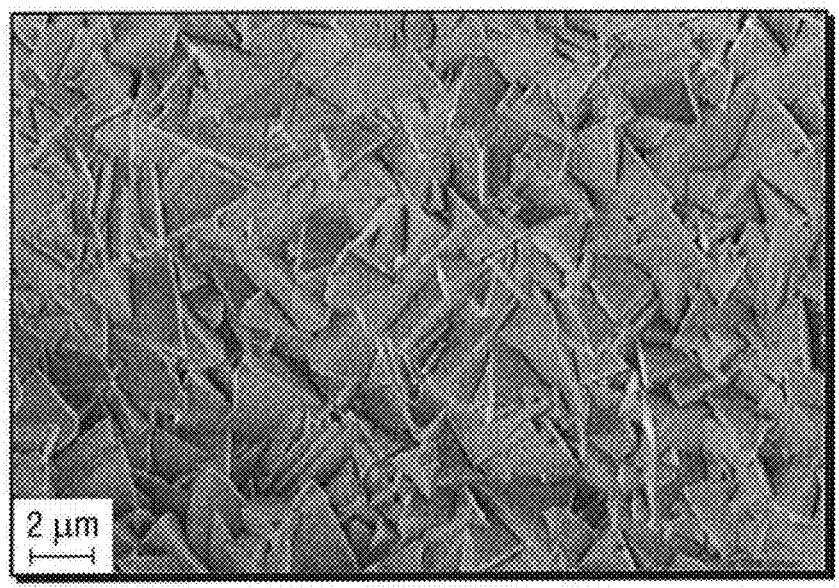
FIG. 7. Top view of the DDR membrane after post-treatment with PDMS.
Figure 8A:
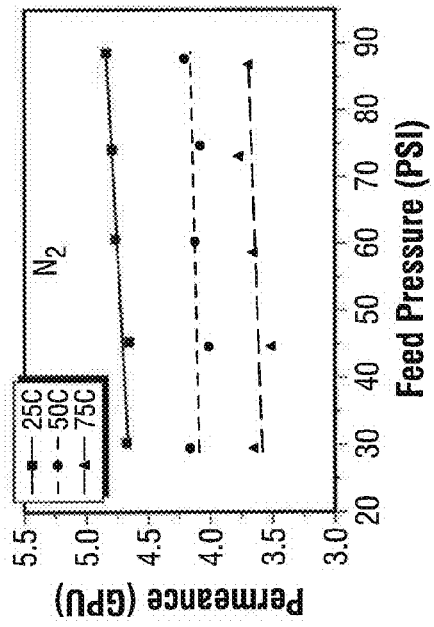
FIG. 8. Temperature and pressure dependence of single-gas permeation in PDMS-treated DDR membranes.
Figure 8B:
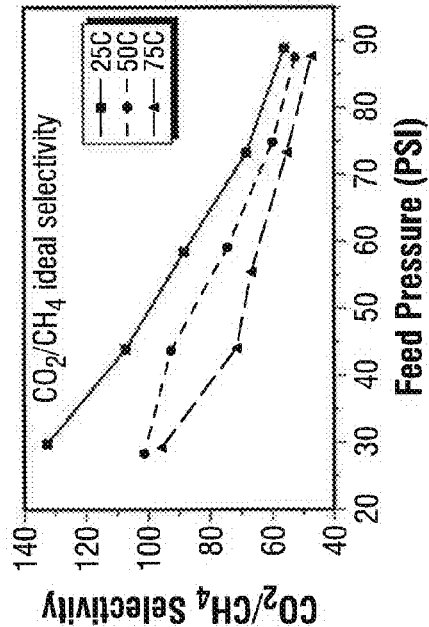
Figure 8C:
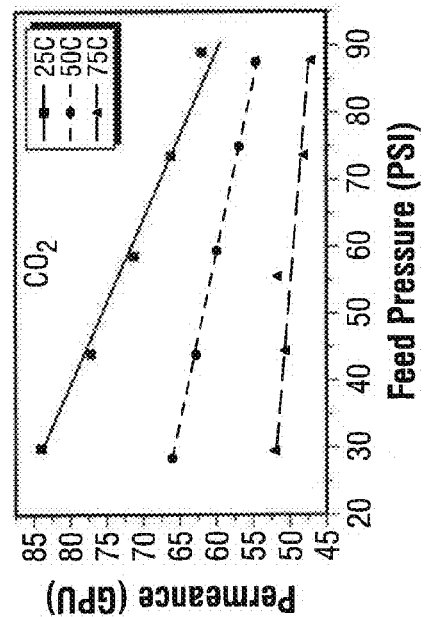
Figure 8D:
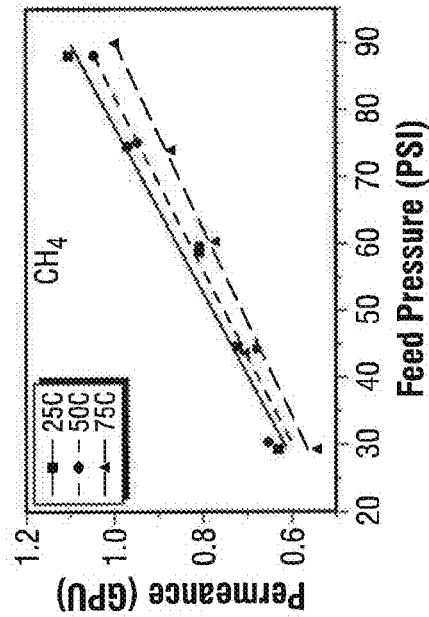

Therefore, the DDR membranes on tubular supports were treated with a PDMS solution under a pressure differential, as described above. The procedure is performed on an assembled membrane module in situ, and does not require further high-temperature processing. The use of vacuum across the membrane is hypothesized to allow selective impregnation of the defects with PDMS, but leaving the zeolite pores largely unaffected. As shown in FIG. 7, the overall appearance of the DDR membrane surface was unchanged after the PDMS treatment, and there was no significant coating of PDMS on the membrane surface.

The single-component gas permeation properties of the PDMS-treated membranes are shown in FIG. 8. The temperature and pressure dependences show significant changes from FIG. 6, clearly indicating that transport in the zeolite is controlled by diffusion and adsorption (after PDMS treatment). Although a small amount of permeation will still occur through the PDMS-plugged defects, it is orders of magnitude smaller than viscous or Knudsen flow through the open defects.

Compared to the defective membrane, the permeance of $CH_4$ in the PDMS-treated membrane is about 2 orders of magnitude lower than for the untreated membrane, whereas the permeance of $CO_2$ remains at the same order of magnitude. After PDMS treatment, the $CH_4/SF_6$ selectivity is about 3.5, slightly higher than that from the untreated membranes and close to both the Knudsen selectivity as well as the $CH_4/SF_6$ selectivity through PDMS (~5). Therefore, the permeance of gases such as $CH_4$ is predominantly through PDMS-filled defects. On the other hand, the permeance of $CO_2$ is mainly through the zeolite and is relatively unaffected by the PDMS treatment.

Thus, sealing the defects results in a reproducible, high $CO_2/CH_4$ selectivity (FIG. 8) without a significant drop in the flux. The data in FIG. 8 are representative of 6 membrane samples fabricated, which all show similar behavior. Due to the large 'kinetic diameter' of the PDMS used in this work (~0.8 nm) [43], the possibility of significant PDMS penetration into the zeolitic pores can be excluded.

Figure 9A:
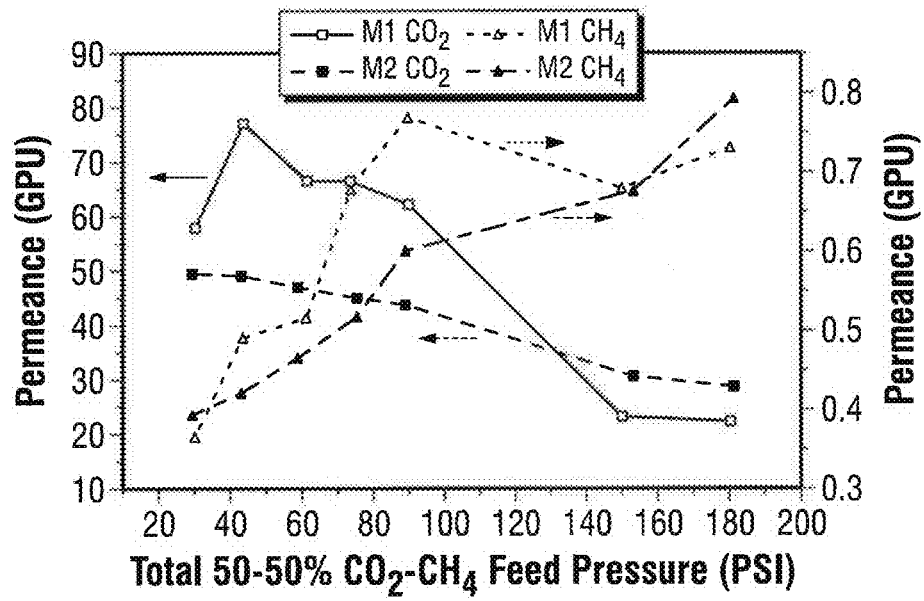
FIG. 9. Permeances of $CO_2$ and $CH_4$, and $CO_2/CH_4$ selectivity at 25° C., with a 50/50 binary feed mixture as a function of pressure.
Figure 9B:
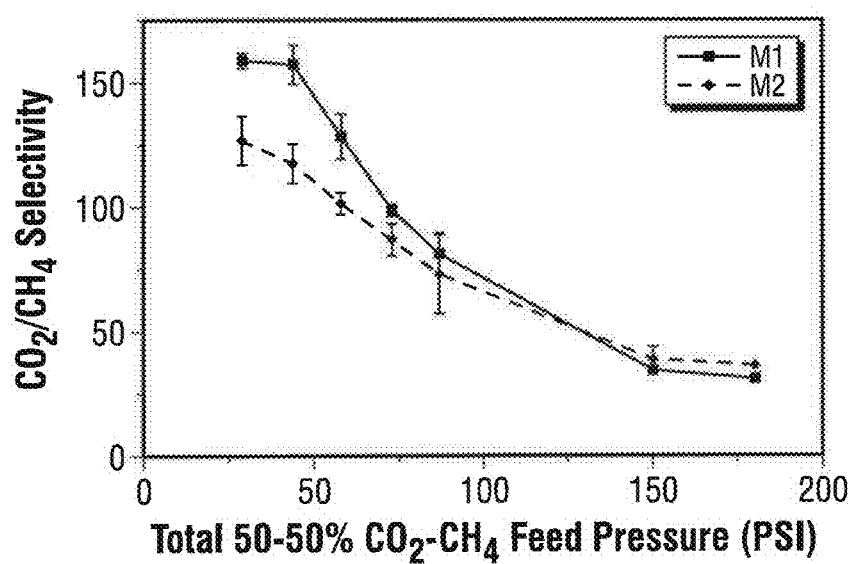

FIG. 9 shows $CO_2/CH_4$ binary permeation data from two different treated DDR membranes, for a 50/50 mol % gas mixture at 25° C. Both the selectivity and permeance in binary permeation show trends similar to those observed in single-gas permeation. The $CO_2$ permeance decreases with increased pressure because of adsorption saturation at higher pressures. The $CH_4$ permeance increases with pressure and approaches a plateau, since $CH_4$ adsorbs weakly in DDR. The membranes show higher selectivity than in single gas permeation primarily due to the preferred adsorption of $CO_2$ over $CH_4$. Due to the opposite trends in the $CO_2$ and $CH_4$ permeances with increasing pressure, the $CO_2/CH_4$ selectivity decreases with increasing pressure and level off at ~40 at 180 psia. More detailed measurements at higher pressures are required in order to fully quantify the selectivity of DDR membranes at high pressures, which may be a significant factor in applications to natural gas separations at these conditions.

Figure 10A:
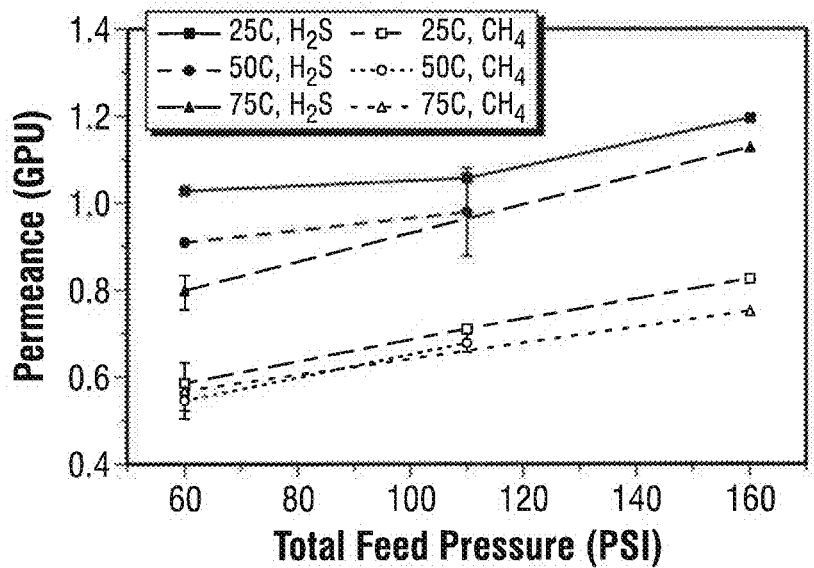
FIG. 10. Permeances of $H_2S$ and $CH_4$, and $H_2S/CH_4$ selectivity, at 25-75° C., with a 3.5/96.5 binary feed mixture as a function of pressure. Representative error bars are shown for selected measurements.
Figure 10B:
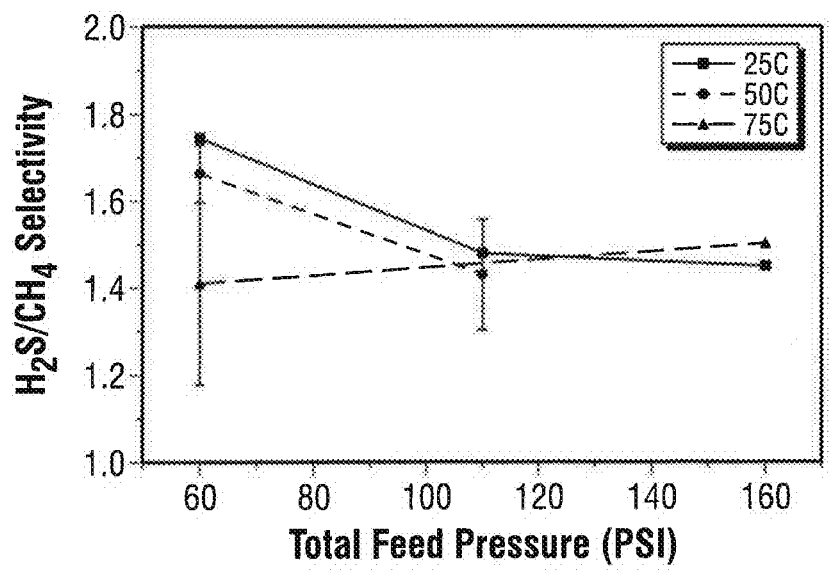

FIG. 10 shows $H_2S/CH_4$ binary permeation data from a post-treated DDR membrane for a 3.5 vol % $H_2S$-96.5 vol % $CH_4$ gas mixture at 25, 50, and 75° C. The membrane maintained stable performance throughout the permeation measurements, totaling approximately 45 hours of online operation. The permeance of $CH_4$ is essentially identical to that measured in the absence of $H_2S$ (FIG. 8), thereby indicating that that the DDR membranes are stable in the presence of high concentrations of $H_2S$.

Both the $H_2S$ and $CH_4$ permeances increase with increased pressure and decrease with increased temperature. $H_2S/CH_4$ selectivities are within the range of ~1.2-1.8 mol $H_2S$/mol $CH_4$. These results provide a first confirmation that DDR membranes exclude $H_2S$ based upon its kinetic diameter (~0.37 nm), and that adsorption of $H_2S$ is not sufficient to increase its permeance to levels similar to that of $CO_2$. Thus, DDR membranes could be used to separate $CO_2$ from natural gas mixtures, whereas $H_2S$ remains in the $CH_4$-rich retentate stream for subsequent separation (e.g., by absorption or adsorption).

The following references are incorporated by reference in their entirety.

U.S. Pat. No. 6,953,493 and U.S. Pat. No. 7,014,680
US2009011926
US2010144512
US2010298115
US2011160039

[1] R. W. Baker, K. Lokhandwala, Natural gas processing with membranes: An overview, Ind. Eng. Chem. Res., 47 (2008) 2109-2121.
[2] A. L. Kohl, R. B. Nielsen, Gas Purification, 5th ed., Gulf Publishing, Houston, Tex., 1997.
[3] E. Favre, Carbon dioxide recovery from post-combustion processes: Can gas permeation membranes compete with absorption?, J. Membr. Sci., 294 (2007) 50-59.
[4] W. J. Koros, R. Mahajan, Pushing the limits on possibilities for large scale gas separation: which strategies?, J. Membr. Sci., 175 (2000) 181-196.
[5] R. W. Baker, Future directions of membrane gas separation technology, Ind. Eng. Chem. Res., 41 (2002) 1393-1411.
[6] J. H. Hao, S. C. Wang, Influence of quench medium on the structure and gas permeation properties of cellulose acetate membranes, J. Appl. Polym. Sci., 68 (1998) 1269-1276.
[7] X. M. Jie, et al., Gas permeation performance of cellulose hollow fiber membranes made from the cellulose/N-methylmorpholine-N-oxide/H2O system, J. Appl. Polym. Sci., 91 (2004) 1873-1880.
[8] J. Caro, M. Noack, Zeolite membranes—Recent developments and progress, Micropor. Mesopor. Mater., 115 (2008) 215-233.
[9] R. Mallada, M. Menendez, Inorganic Membranes: Synthesis, Characterization and Applications, Elsevier, Oxford, UK, 2008.
[10] J. Choi, H. K. et al., Grain Boundary Defect Elimination in a Zeolite Membrane by Rapid Thermal Processing, Science, 325 (2009) 590-593.
[11] S. Sommer, T. Melin, Influence of operation parameters on the separation of mixtures by pervaporation and vapor permeation with inorganic membranes. Part 1: Dehydration of solvents, Chem. Eng. Sci., 60 (2005) 4509-4523.
[12] K. Weh, et al., Permeation of single gases and gas mixtures through faujasite-type molecular sieve membranes, Micropor. Mesopor. Mater., 54 (2002) 27-36.
[13] J. Lindmark, J. Hedlund, Modification of MFI membranes with amine groups for enhanced CO2 selectivity, J. Mater. Chem., 20 (2010) 2219-2225.
[14] M. A. Carreon, et al., Alumina-supported SAPO-34 membranes for CO2/CH4 separation, J. Am. Chem. Soc., 130 (2008) 5412-5413.
[15] S. G. Li, et al., Scale-up of SAPO-34 membranes for CO2/CH4 separation, J. Membr. Sci., 352 (2010) 7-13.
[16] Y. Cui, et al., Preparation and gas separation performance of zeolite T membrane, J. Mater. Chem., 14 (2004) 924-932.
[17] Y. Cui, et al., Preparation and gas separation properties of zeolite T membrane, Chem. Commun., 17 (2003) 2154-2155.
[18] S. Himeno, et al. Synthesis and Permeation Properties of a DDR-Type Zeolite Membrane for Separation of CO2/CH4 Gaseous Mixtures, Ind. Eng. Chem. Res., 46 (2007) 6989-6997.
[19] J. van den Bergh, et al., Separation and permeation characteristics of a DD3R zeolite membrane, J. Membr. Sci., 316 (2008) 35-45.
[20] J. van den Bergh, et al., Modeling Permeation of CO2/CH4, N2/CH4, and CO2/Air Mixtures across a DD3R Zeolite Membrane, J. Phys. Chem. C, 114 (2010) 9379-9389.
[21] Z. Zheng, et al., Synthesis, characterization and modification of DDR membranes grown on alpha-alumina supports, J. Mater. Sci., 43 (2008) 2499-2502.
[22] M. Kanezashi, et al., Gas permeation through DDR-type zeolite membranes at high temperatures, AIChE J., 54 (2008) 1478-1486.
[23] T. Tomita, et al., Gas separation characteristics of DDR type zeolite membrane, Micropor. Mesopor. Mater., 68 (2004) 71-75.
[24] G. Xomeritakis, et al., Transport properties of alumina-supported MFI membranes made by secondary (seeded) growth, Micropor. Mesopor. Mater., 38 (2000) 61-73.
[25] S. Himeno, et al., Characterization and selectivity for methane and carbon dioxide adsorption on the all-silica DD3R zeolite, Micropor. Mesopor. Mater., 98 (2007) 62-69.
[26] S. E. Jee, D. S. Sholl, Carbon Dioxide and Methane Transport in DDR Zeolite: Insights from Molecular Simulations into Carbon Dioxide Separations in Small Pore Zeolites, J. Am. Chem. Soc., 131 (2009) 7896-7904.
[27] M. J. den Exter, et al., Separation of permanent gases on the all-silic 8-ring clathrasil DD3R in: J. Weitkamp, H. G. Karge, H. Pfeifer, W. Holderich (Eds.) Zeolites and Related Microporous Materials: State of the Art 1994, Elsevier, The Netherlands, 1994, pp. 1159-1166.
[28] J. Gascon, et al., Accelerated synthesis of all-silica DD3R and its performance in the separation of propylene/propane mixtures, Micropor. Mesopor. Mater., 115 (2008) 585-593.
[29] Q. Yang, et al., Synthesis of DDR-Type Zeolite in Fluoride Medium, Chinese Journal of Inorganic Chemistry, 25 (2009) 191-194.
[30] P. Kumar, et al., Ordered mesoporous membranes: Effects of support and surfactant removal conditions on membrane quality, J. Membr. Sci., 279 (2006) 539-547.
[31] S. Nair, et al., Separation of close boiling hydrocarbon mixtures by MFI and FAU membranes made by secondary growth, Micropor. Mesopor. Mater., 48 (2001) 219-228.
[32] S. Husain, Mixed matrix dual layer hollow fiber membranes for natural gas purification, Dissertation, Georgia Institute of Technology, Atlanta, Ga., 2006.
[33] A. S. Huang, J. Caro, Cationic Polymer Used to Capture Zeolite Precursor Particles for the Facile Synthesis of Oriented Zeolite LTA Molecular Sieve Membrane, Chem. Mater., 22 (2010) 4353-4355.
[34] A. N. Parikh et al., Non-thermal calcination by ultraviolet irradiation in the synthesis of microporous materials, Micropor. Mesopor. Mater., 76 (2004) 17-22.
[35] S. Heng, et al., Low-temperature ozone treatment for organic template removal from zeolite membrane, J. Membr. Sci., 243 (2004) 69-78.
[36] J. Kuhn, et al., Detemplation of DDR type zeolites by ozonication, Micropor. Mesopor. Mater., 120 (2009) 12-18.
[37] W. C. Yoo, et al., A. Stein, High-Performance Randomly Oriented Zeolite Membranes Using Brittle Seeds and Rapid Thermal Processing, Angew. Chem., Int. Ed., 49 (2010) 8699-8703.

[38] K. Kusakabe, et al., Formation of a Y-type zeolite membrane on a porous alpha-alumina tube for gas separation, Ind. Eng. Chem. Res., 36 (1997) 649-655.
[39] K. Nakayama, et al., Method for preparing DDR type zeolite membrane, in: US Patent Office, 2005.
[40] Y. S. Yan, M. E. Davis, G. R. Gavalas, Preparation of highly selective zeolite ZSM-5 membranes by a post-synthetic coking treatment, J. Membr. Sci., 123 (1997) 95-103.
[41] Y. Zhang, A. M. Avila, B. Tokay, H. H. Funke, J. L. Falconer, R. D. Noble, Blocking defects in SAPO-34 membranes with cyclodextrin, J. Membr. Sci., 358 (2010) 7-12.
[42] H. Matsuda, et al., Improvement of ethanol selectivity of silicalite membrane in pervaporation by silicone rubber coating, J. Membr. Sci., 210 (2002) 433-437.
[43] W. V. Chiu, et al., Post-synthesis defect abatement of inorganic membranes for gas separation, J. Membr. Sci., 377 (2011) 182-190.

What is claimed is:

1. A method for preparing DDR membranes on porous substrates, said method comprising the steps of:
   a) preparing seed DDR zeolite crystals in a first growth solution comprising about 6 ADA:100 SiO2:50 KF:8000 H2O, said seed DDR zeolite crystals having a uniform crystal structure and size;
   b) seeding a porous substrate with said seed DDR zeolite crystals of 200-600 nm;
   c) growing a DDR zeolite membrane by incubation in a second growth solution selected from the group consisting of about 6 ADA:100 SiO2 50 KF:10000 H2O, about 6 ADA:100 SiO2:x KF:4000 H2O, where x=60-100 and about 9 ADA:100 SiO2:80 KF:4000 H2O;
   d) optionally calcining said DDR zeolite membrane; and
   e) optionally sealing any defects in said DDR zeolite membrane by incubation with using a polydimethylsiloxane (PDMS) solution under a pressure differential.

2. The method of claim 1, further comprising washing said DDR zeolite membrane.

3. The method of claim 1, wherein said porous support is α-alumina.

4. The method of claim 1, wherein said calcining is at 500-700° C. for 6-24 hours.

5. The method of claim 1, wherein said porous support is organic or inorganic and has 10-60% porosity and pores of 200-500 nm.

6. The method of claim 1, wherein said porous support is selected from the group consisting of polypropylene, polyethylene, polytetrafluoroethylene, polysulphone, polyimide, silica, alpha-alumina, gamma-alumina, mullite, zirconia, titania, yttria, silicon nitride, silicon carbide, iron, bronze and stainless steel, glass, and carbon.

7. The method of claim 1, wherein said porous support is tubular α-alumina.

8. The method of claim 1, wherein said porous support is tubular α-alumina having a porosity of 10-50% and a pore size of 100-400 nm.

9. The method of claim 1, wherein said porous support is tubular α-alumina having a porosity of 30% and a pore size of 200-300 nm.

10. The method of claim 5, wherein said calcining is at 700° C. for 8 hours.

11. The method of claim 5, wherein said PDMS step is with 2-20 wt % PDMS solution, while a vacuum is applied from the inner bore of said tubular a-alumina, followed by heat curing.

12. The method of claim 5, wherein said PDMS step is with 5% PDMS in n-heptanes for 5-20 minutes, while a vacuum is applied from the inner bore of said tubular α-alumina, followed by heat curing at about 80° C. for about 4 hours.

13. A DDR zeolite membrane made by any one of method claims 1-10.

14. A method of separating a small molecule from a mixture of small molecules, said method comprising applying a mixture of small molecules selected from $CO_2$, $CH_4$, $N_2$, $O_2$, $C_2H_4$, $C_2H_6$, $C_3H_6$, $C_3H_8$ to a membrane of claim 11, and separating out a small molecule from said mixture.

15. A method of separating a CO2 molecule from a mixture of small molecules, said method comprising applying a mixture of small molecules selected from $CO_2$, $CH_4$, $N_2$, $O_2$, $C_2H_4$, $C_2H_6$, $C_3H_6$, $C_3H_8$ to a membrane of claim 11, and separating out $CO_2$ from said mixture.

16. The method of claim 1, wherein the second growth solution is about 6 ADA:100 SiO2:50 KF:10000 H2O.

17. The method of claim 1, wherein the second growth solution is about 6 ADA:100 SiO2:x KF:4000 H2O, where x=60-100.

18. The method of claim 1, wherein the second growth solution is about 9 ADA:100 SiO2:80 KF:4000 H2O.

19. The method of claim 1, wherein the first growth solution is at temperature of about 130-160° C., and wherein the second growth solution is at temperature of about 150° C. or about 160° C.

* * * * *